US006580756B1

(12) United States Patent
Matsui et al.

(10) Patent No.: US 6,580,756 B1
(45) Date of Patent: Jun. 17, 2003

(54) DATA TRANSMISSION METHOD, DATA TRANSMISSION SYSTEM, DATA RECEIVING METHOD, AND DATA RECEIVING APPARATUS

(75) Inventors: Yoshinori Matsui, Katano (JP); Makoto Hagai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/458,009

(22) Filed: Dec. 10, 1999

(30) Foreign Application Priority Data

Dec. 11, 1998 (JP) .......................................... 10-353318

(51) Int. Cl.$^7$ ................................................ H04N 7/18
(52) U.S. Cl. ............................ 375/240.08; 375/240.08; 375/240.26
(58) Field of Search ....... 348/7–13; 375/240.05–240.29

(56) References Cited

U.S. PATENT DOCUMENTS 6,097,380 A * 8/2000 Crites et al. ............. 707/500.1
6,292,805 B1 * 9/2001 Basso et al. ............. 707/103 R
6,295,380 B1 * 9/2001 Takahashi .................... 341/79

FOREIGN PATENT DOCUMENTS

JP     10-285593     10/1998
JP     10-304353     11/1998

* cited by examiner

*Primary Examiner*—Andy Rao
(74) *Attorney, Agent, or Firm*—Wenderoth, Lind & Ponack, L.L.P.

(57) ABSTRACT

A data transmission system comprises a data transmission apparatus for transmitting plural pieces of object data for reproducing plural objects constituting a scene, and a data receiving apparatus for receiving the plural pieces of object data and reproducing the scene on the basis of the object data. The data transmission apparatus comprises a first transmission unit for transmitting first object data, amongst the plural pieces of object data, such that reproduction of the scene is performed at the receiving end on the basis of the first object data after the transmission of the first object data has been completed, and a second transmission unit for transmitting second object data other than the first object data, amongst the plural pieces of object data, such that reproduction of the scene is performed at the receiving end on the basis of the second object data during the transmission of the second object data.

18 Claims, 14 Drawing Sheets

Fig.2

(SDP:Session Description Protocol)

| | | |
|---|---|---|
| m= | data type (IOD) | |
| a = | transmission mode | URL of IOD |
| m= | data type (ODS) | |
| a = | transmission mode | URL of ODS |
| a = | object id | |
| m= | data type (SDS) | |
| a = | transmission mode | URL of SDS |
| a = | object id | |
| ⋮ | | |
| m= | data type (video) | |
| a = | transmission mode | URL of entity data |
| a = | object id | |
| m= | data type (audio) | |
| a = | transmission mode | URL of entity data |
| a = | object id | |
| m= | data type (text) | |
| a = | transmission mode | URL of entity data |
| a = | object id | |

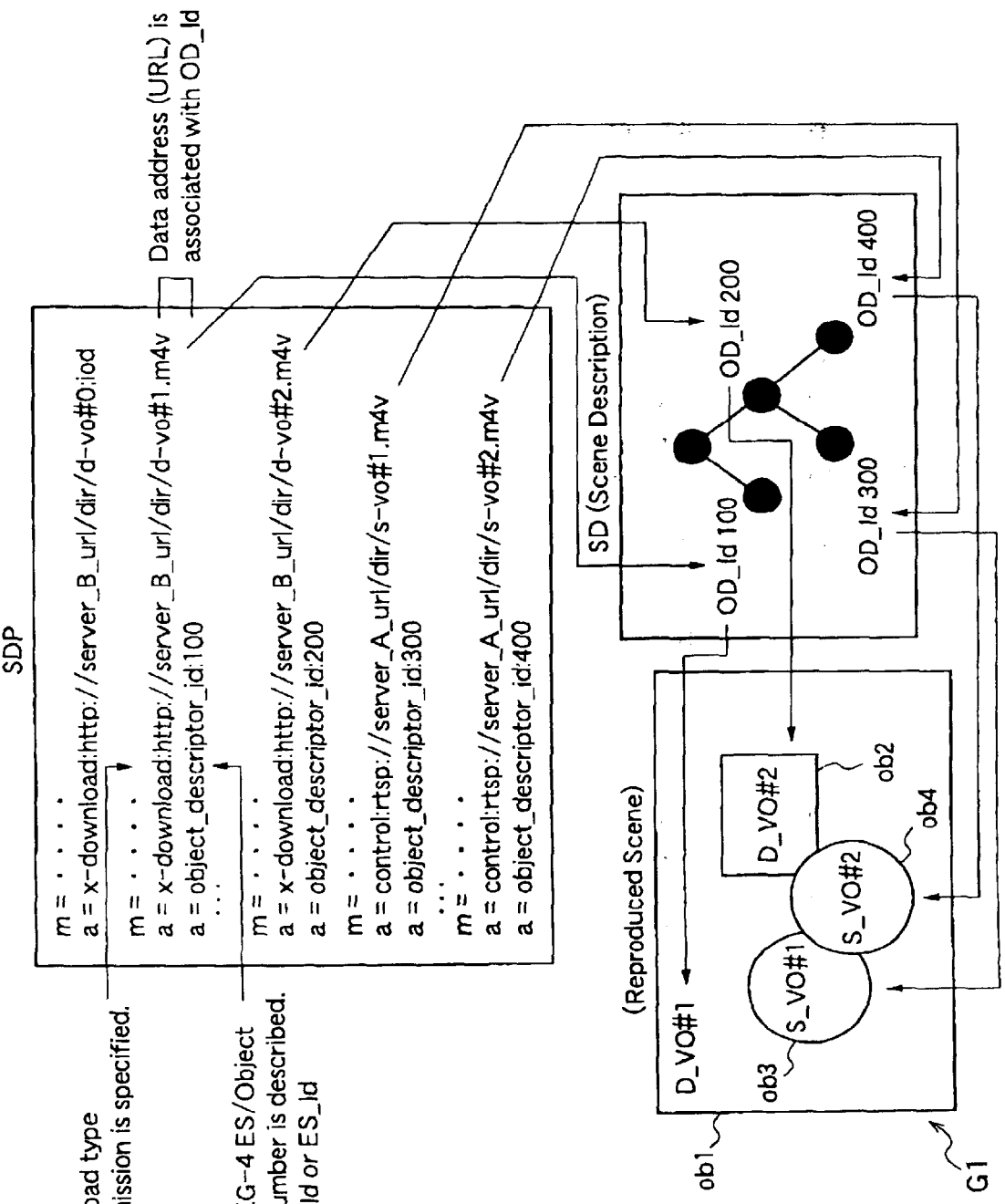

(ODS:Object Descriptor Stream)

(SDS:Scene Description Stream)

DATA TRANSMISSION METHOD, DATA TRANSMISSION SYSTEM, DATA RECEIVING METHOD, AND DATA RECEIVING APPARATUS

FIELD OF THE INVENTION

The present invention relates to a data transmission method, a data transmission system, a data receiving method, and a data receiving apparatus and, more particularly, to a method for transmitting image data of MPEG4, through the Internet, according to a transmission mode adapted to the type of the image data.

BACKGROUND OF THE INVENTION

In recent years, we have greeted the age of multimedia in which audio, video, and other data are integrally handled, and the conventional information media, i.e., means for transmitting information to men, such as newspapers, magazines, televisions, radios, and telephones, have been adopted as the targets of multimedia. Generally, "multimedia" means media in which, not only characters, but also diagrams, speeches, and especially images are simultaneously expressed in relation with each other. In order to handle the conventional information media as the targets of multimedia, it is necessary to represent the data in digital formats.

When the quantity of data possessed by each of the above-described information media is estimated as the quantity of digital data, in the case of characters, the data quantity per character is only 1~2 byte. However, in the case of speech, the data quantity is 64 kbits per second (quality for telecommunication). Further, in the case of moving picture, the required data quantity is more than 100 Mbits per second (quality for current television broadcasting). So, in the above-described information media, it is not practical to handle such massive data as it is in the digital format. For example, although visual telephones have already been put to practical use by the ISDN (Integrated Services Digital Network) having a transmission ratio of 64 kbps~1.5 Mbps, it is impossible to transmit an image from a television camera as it is by the ISDN.

So, data compression techniques are demanded. For example, for visual telephones, the moving picture compression techniques based on the H.261 and H.263 standards which have been standardized by ITU-T (International Telecommunication Union—Telecommunication Sector) are employed. Further, according to the data compression technique based on the MPEG1 standard, it is possible to record image data as well as audio data in an ordinary music CD (compact disk).

MPEG (Moving Picture Experts Group) is an international standard relating to a data compression technique for an image signal corresponding to a moving picture, and MPEG1 is the standard for compressing moving picture data to 1.5 Mbps, i.e., data of a television signal to about 1/100. Since the transmission rate of the targets to which the MPEG1 standard is directed is limited to about 1.5 Mbps, in MPEG2 which has been standardized to meet the demand for higher image quality, moving picture data is compressed to 2~15 Mbps.

Furthermore, under the existing circumstances, standardization of MPEG4 is now proceeded by the working group for standardization of MPEG1 and MPEG2 (ISO/IEC JTC1/SC29/WG11), and this MPEG4 enables coding and signal processing in object units, and hereby realizes new functions required in the age of multimedia.

FIGS. 7, and 8(a)–8(d) are diagrams for explaining the object-by-object coding process.

In MPEG4, an image G corresponding to one frame shown in FIG. 7 is treated as a composite image which is obtained by compositing plural objects. The image G is composed of a background B (FIG. 8(a)), a big fish F1 as a first foreground (FIG. 8(b)), a small fish F2 as a second foreground (FIG. 8(c)), and a seaweed F3 as a third foreground (FIG. 8(d)).

Further, in the object-by-object coding process based on MPEG4, image data corresponding to the respective objects constituting the composite image G (the background B and the first to third foregrounds F1~F3) are encoded object by object. Then, coded image data (object data) corresponding to the respective objects are transmitted through a transmission medium.

On the other hand, in the object-by-object decoding process based on MPEG4, the coded image data corresponding to the respective objects are received object by object or in the multiplexed state, through the transmission medium. The received coded image data are decoded object by object, thereby generating decoded image data corresponding to each object. Then, the decoded image data corresponding to the respective objects are composited, thereby generating reproduced image data (scene data) corresponding to the composite image (decoded and reproduced image) G.

In the above-described process for transmitting the object-by-object coded image data, not only the coded image data (object data) obtained by coding the image data object by object but also control information are transmitted through the transmission medium. The control information includes, for example, scene description information which indicates the locations of the respective objects in one frame for compositing and displaying the objects, i.e., the display area of the composite image (refer to FIG. 15(b)).

Meanwhile, in recent years, a video distribution system has spread, in which the user can gain access to his/her favorite moving picture through a computer network.

FIG. 9 is a schematic diagram for explaining such video distribution system.

In a video distribution system 700, a plurality of networks 701, 702 and 703 are connected to each other, and a plurality of servers 705, 706 and 707 which distribute video information are connected to the networks 701, 702 and 703, respectively. Further, a plurality of video reception and reproduction terminal units (hereinafter referred to simply as "terminal units") which receive the distributed video information are connected to the respective networks 701~703. To simplify the description, only a terminal unit 704 connected to the network 701 is shown in FIG. 9.

In the video distribution system 700 so constructed, when the terminal unit 704 receives video information distributed from the server 705, initially, the terminal unit 704 contacts the server 705, and effectuates a circuit connection with the server 705. Thereafter, the terminal unit 704 receives coded image data distributed from the server 705, and reproduces the image data by decoding.

Hereinafter, a description will be given of a specific process of obtaining predetermined image data through the Internet as the above-described network.

As described above, a plurality of information sources (servers) are connected to the Internet which forms the network in the current information distribution system, and the respective information sources contain, for example, information of home pages relating to various subjects. Now it is assumed that the terminal unit 704 is connected to an information source having information of a home page HP the title of which is "World of Dinosaurs", and this home page HP is displayed on a display of the terminal unit 704.

In this home page HP, as shown in FIG. 10, items of video scenes relating to dinosaurs are represented by character strings "scene 1"~"scene 3", and the display areas of these character strings are designation areas D1~D3 for designating the moving pictures. In this state, the user moves the mouse pointer MP to the designation area D1 corresponding to the character string "scene 1" in the home page HP and clicks the mouse, an image MPs of a video scene P linked to the character string "scene 1" is displayed as shown in FIG. 11(*a*).

As a data transmission method for transmitting the image (text, audio, and video) data on the Internet, download type transmission and stream type transmission are currently employed.

In the download type transmission, a video file (image data) transmitted from a distribution server is once copied at the terminal and, thereafter, the image corresponding to the video file is reproduced. So, the terminal cannot start image reproduction until the file transmission is completed. That is, there is a latency time for transmission and, therefore, the download type transmission is not suitable for long-hours reproduction of video and audio. On the other hand, in the stream type transmission, while transmitting video data or the like from the distribution server to the terminal, image reproduction is carried out on the basis of the received data at the terminal end.

Therefore, data to be processed in real time, such as video data and audio data, are transmitted by the stream type transmission.

Recently, stream type transmission using a protocol called RTP (Real-time Transport Protocol) has been mainly employed. In a communication system in which a distribution server (transmitting end) S and a terminal (receiving end) T such as a personal computer are connected by a circuit such as ISDN in the Internet as shown in FIG. 16, transmission of image data is performed according to the RTP.

In the data transmission according to the RTP, processes for the respective packets are synchronized between the transmitting end and the receiving end by using time stamps as time information, and asynchronous (late arrival) packets and error packets in which transmission errors have occurred are discarded at the receiving end. Further, discarded or lost packets are detected at the receiving end, according to the absences of sequence numbers given to these packets.

Under the circumstances described above, in recent years, a method for transmitting image data of MPEG4 through the Internet has been examined.

In MPEG4, the video scene P shown in FIG. 11(*a*) is treated as a composite image G1 which is composed of four objects ob1, ob2, ob3, and ob4 (refer to FIG. 11(*b*)). That is, in this composite image G1, the object ob1 is a background as a still picture showing the sky or the like (FIG. 12(*a*)), the object ob2 is a first foreground as a cyclic moving picture showing a volcano (FIG. 12(*b*)), the object ob3 is a second foregound as a moving picture showing a big dinosaur (FIG. 12(*c*)), and the object ob4 is a third foreground as a moving picture showing a small dinosaur (FIG. 12(*d*)).

Hereinafter, a data transmission method based on MPEG4, which is currently examined, will be described by using FIGS. 15(*a*) and 15(*b*). In the following description, a plurality of servers may be connected to the terminal T.

In this data transmission method, image data corresponding to one scene (composite image) treated in MPEG4 is obtained for each of plural objects constituting the scene, from a predetermined server, by the RTP, through the Internet.

Initially, as already described with respect to FIG. 10, in the state where the home page HP is displayed on the display unit of the terminal T, when the user clicks the mouse at the designation area D1 corresponding to the character string "scene 1", a session description protocol (SDP) (FIG. 13(*a*)) and an initial object descriptor (IOD) (FIG. 13(*b*)), which correspond to the scene (composite image) G1 and are linked to the character string "scene 1", are transmitted from the server S containing these data to the terminal T through the Internet (refer to FIG. 9).

With reference to FIG. 13(*a*), in the SDP (hereinafter also referred to as SDP information), the type of data is described in association with a transmission mode and a URL (Uniform Resource Locator) of the data, which are required for reproduction of the composite image. To be specific, as the above-mentioned data, there are not only the object data (entity data) for reproducing the respective objects constituting the scene, i.e., image data, audio data, and text data, but also control information, i.e., an initial object descriptor (IOD), an object descriptor stream (ODS), and a scene description stream (SDS).

Further, as shown in FIG. 13(*b*), in the initial object descriptor (hereinafter also referred to as IOD information), data of the object descriptor (OD) corresponding to the ODS itself, and data of the object descriptor (OD) corresponding to the SDS itself, are stored.

Further, as shown in FIG. 14(*a*), in the ODS (hereinafter also referred to as ODS information), data of object descriptors (OD) of all objects constituting the scene are stored. Further, as shown in FIG. 14(*b*), in the SDS (hereinafter also referred to as SDS information), data of scene descriptions SD1~SDn corresponding to predetermined times t1~tn are stored.

When the SDP information and the IOD information are transmitted to the terminal T, the terminal T requests the server S to transmit the ODS information corresponding to the respective objects (i.e., object descriptors OD1~OD4) and the entity data, by specifying their uniform resource locators (URL) and synchronization sources (hereinafter referred to simply as SSRC). Further, the terminal T requests the server S to transmit the SDS information corresponding to the scene G1 (i.e., the scene descriptions SD1~SDn), by specifying the URL and SSRC. The SSRC is a channel ID for identifying a channel of the RTP packet.

On receipt of the request from the terminal T, the server S packetizes the requested data, gives the SSRC specified by the terminal to each packet, and transmits the packets to the terminal T according to the RTP.

The terminal T receives the image data (object data) of the respective objects constituting the scene G1, the object descriptors OD1~OD4, and the scene descriptions SD1~SDn. Based on these data, the terminal T reproduces and displays the image of the scene G1.

FIG. 15(*a*) shows the specific contents of the object descriptor OD1 (id=100), and FIG. 15(*b*) shows the specific contents of the scene description SD1 (time t1).

However, the image data according to MPEG4 includes data (control information) which prevents image reproduction if a transmission error occurs in this data, such as the SDP information, the IOD information, the SDS information, and the ODS information. When such data (control information) is transmitted according to the RTP, since recovery against the transmission error is not performed, the state where the image data cannot be reproduced, occurs frequently at the receiving end.

Further, when download type transmission and the stream type transmission are performed in arbitrary order, the image data are sometimes transmitted by the download transmission while reproducing the image data transmitted by the stream type transmission. In this case, the data transmission quantity during scene reproduction increases significantly, and the consumption of the transmission band of the network cannot be minimized.

Further, although the number of the objects constituting he scene and the hierarchy of the objects can be grasped from the SDS information and the ODS information, the correspondence between the address (URL) of the object data (image data corresponding to each object) and each object cannot be obtained.

SUMMARY OF THE INVENTION

The present invention is made to solve the above-described problems and has for its object to provide a data transmission method, a data transmission system, a data receiving method, and a data receiving apparatus, which avoid unreliability of image reproduction at a receiving terminal due to transmission error, and assure reliable image reproduction at the receiving terminal even when some transmission error occurs.

It is another object of the present invention to provide a data transmission method, a data transmission system, a data receiving method, and a data receiving apparatus, which prevent data transmission quantity during from increasing considerably scene reproduction, and thereby minimize the consumption of the transmission band of the network.

It is still another object of the present invention to provide a data transmission method, a data transmission system, a data receiving method, and a data receiving apparatus, in which each object can be associated with the URL (Uniform Resource Locator) of image data corresponding to the object, on the basis of the SDP (Session Description Protocol) corresponding to the scene.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a data transmission method of transmitting plural pieces of object data for reproducing plural objects constituting a scene, from the transmitting end to the receiving end. This method comprises a first transmission process of transmitting first object data, among the plural pieces of object data, such that reproduction of the scene is performed at the receiving end on the basis of the first object data after the transmission of the first object data has been completed; and a second transmission process of transmitting second object data other than the first object data, among the plural pieces of object data, such that reproduction of the scene is performed at the receiving end on the basis of the second object data during the transmission of the second object data. Therefore, extreme increase in the data transmission quantity during scene reproduction is avoided, and the consumption of the transmission band of the network is minimized.

According to a second aspect of the present invention, there is provided a data transmission method for transmitting scene data for reproducing a scene, from the transmitting end to the receiving end. This method comprises a first transmission process of transmitting first data which is a part of the scene data, in accordance with a first transmission protocol which does not necessarily perform retransmission against transmission errors; and a second transmission process of transmitting second data which is a part of the scene data, in accordance with a second transmission protocol which performs retransmission against transmission errors. The second data is scene description information and object relevant information, the scene description information indicating the hierarchy of the respective objects constituting the scene, by object identifiers which are given to the respective objects for identifying these objects, and the object relevant information indicating additional information relating to the respective objects, in association with the object identifiers of the respective objects. Therefore, this method can prevent image reproduction at the receiving end from becoming unreliable due to transmission error, and the receiving end can perform reliable image reproduction even when some transmission error occurs.

According to a third aspect of the present invention, there is provided a data transmission method for transmitting scene data for reproducing a scene, from the transmitting end to the receiving end. This method comprises the steps of transmitting object data for reproducing plural objects constituting the scene, object by object, from the transmitting end to the receiving end; and transmitting table information from the transmitting end to the receiving end, the table information associating an object identifier given to each object for identifying the object, with location information indicating the location of object data corresponding to the object. Therefore, the receiving end can associate each object with the location of object data corresponding to the object, on the basis of the table information.

According to a fourth aspect of the present invention, there is provided a data transmission system comprising a data transmission apparatus for transmitting plural pieces of object data for reproducing plural objects constituting a scene; and a data receiving apparatus for receiving the plural pieces of object data and reproducing the scene on the basis of the object data. The data transmission apparatus comprises a first transmission unit for transmitting first object data, among the plural pieces of object data, such that reproduction of the scene is performed at the receiving end on the basis of the first object data after the transmission of the first object data has been completed; and a second transmission unit for transmitting second object data other than the first object data, among the plural pieces of object data, such that reproduction of the scene is performed at the receiving end on the basis of the second object data during the transmission of the second object data. Therefore, extreme increase in the data transmission quantity during scene reproduction is avoided, and the consumption of the transmission band of the network is minimized.

According to a fifth aspect of the present invention, in the data transmission system of the fourth aspect, the data transmission apparatus transmits, by using the first transmission unit, control information for controlling transmission of the object data and reproduction of the objects, as initial data to be transmitted to the receiving end in the transmission process for data corresponding to one scene, the control information including transmission mode identification information indicating that the object data corresponding to each of the objects constituting one scene is to be transmitted by the first transmission unit or the second transmission unit. Therefore, in addition to the effect of minimizing the consumption of the transmission band of the network, this system can prevent image reproduction at the receiving end from becoming unreliable due to transmission error.

According to a sixth aspect of the present invention, there is provided a data transmission system comprising a data transmission apparatus for transmitting scene data for reproducing a scene; and a data receiving apparatus for receiving the scene data and reproducing the scene. The data transmission apparatus comprises a first transmission unit for transmitting first data which is a part of the scene data, in accordance with a first transmission protocol which does not necessarily perform retransmission against transmission errors; and a second transmission unit for transmitting second data which is a part of the scene data, in accordance with a second transmission protocol which performs retransmission against transmission errors. The second transmission unit transmits, as the second data, scene description information and object relevant information, the scene description information indicating the hierarchy of the respective objects constituting the scene, by object identifiers which are given to the respective objects for identifying these objects, and the object relevant information indicating additional information relating to the respective objects, in association with the object identifiers of the respective objects. Therefore, this system can prevent image reproduction at the receiving end from becoming unreliable due to transmission error, and the receiving end can perform reliable image reproduction regardless of some transmission error.

According to a seventh aspect of the present invention, there is provided a data transmission system comprising a data transmission apparatus for transmitting, object by object, object data for reproducing plural objects constituting a scene; and a data receiving apparatus for receiving the object data and reproducing the scene on the basis of the object data. The data transmission apparatus comprises an information transmission unit for transmitting table information which associates an object identifier given to each object for identifying the object, with location information indicating the location of object data corresponding to the object. Therefore, the receiving end can associate each object with the location of object data corresponding to the object, on the basis of the table information.

According to an eighth aspect of the present invention, in the data transmission system of the seventh aspect, the information transmission unit transmits the table information in such a manner that the table information is included in control information for controlling transmission of the object data and reproduction of the objects, the control information being initial information to be transmitted to the receiving end in the transmission process for data corresponding to the scene. Therefore, the receiving end can associate each object with the location of object data corresponding to the object, on the basis of the table information.

According to a ninth aspect of the present invention, in the data transmission system of the seventh aspect, the information transmission unit transmits the table information in such a manner that the table information is included in object relevant information which indicates additional information relating to the respective objects in association with object identifiers of the respective objects. Therefore, the receiving end can associate each object with the location of object data corresponding to the object, on the basis of the table information.

According to a tenth aspect of the present invention, there is provided a data receiving method for receiving plural pieces of object data for reproducing plural objects constituting a scene, transmitted from the transmitted end, and reproducing the scene on the object data. This method comprises a first receiving process of receiving first object data among the plural pieces of object data, and reproducing the scene on the basis of the first object data after the reception of the object data has been completed; and a second receiving process of receiving second object data other than the first object data among the plural pieces of object data and, simultaneously reproducing the scene on the basis of the second object data. Therefore, extreme increase in the data transmission quantity during scene reproduction is avoided, and the consumption of the transmission band of the network is minimized.

According to an eleventh aspect of the present invention, there is provided a data receiving method for receiving scene data for reproducing a scene, transmitted from the transmitting end, and reproducing the scene. This method comprises a first receiving process of receiving first data which is a part of the scene data, transmitted according to a first transmission protocol which does not necessarily perform retransmission against transmission errors; and a second receiving process of receiving second data which is a part of the scene data, transmitted according to a second transmission protocol which performs retransmission against transmission errors. The second data is scene description information and object relevant information, the scene description information indicating the hierarchy of the respective objects constituting the scene, by object identifiers corresponding to the respective objects, and the object relevant information indicating additional information relating to the respective objects, in association with the object identifiers of the respective objects. Therefore, this method can prevent image reproduction at the receiving end from becoming unreliable due to transmission error, and satisfactory scene reproduction is performed regardless of some transmission error.

According to a twelfth aspect of the present invention, there is provided a data receiving method for receiving scene data for reproducing a scene, transmitted from the transmitting end, and reproducing the scene. This method comprises the steps of receiving object data for reproducing plural objects reconstituting the scene, which are transmitted object by object from the transmitting end; and receiving table information transmitted from the transmitting end, the table information associating an object identifier given to each object for identifying the object, with location information indicating the location of object data corresponding to the object. Therefore, during scene reproduction, each object can be associated with the location of object data corresponding to the object, on the basis of the table information.

According to a thirteenth aspect of the present invention, there is provided a data receiving apparatus for receiving plural pieces of object data for reproducing plural objects constituting a scene, transmitted from the transmitting end, and reproducing the scene on the basis of the object data. This apparatus comprises a first receiving unit for receiving first object data among the plural pieces of object data; a second receiving unit for receiving second object data other than the first object data among the plural pieces of object data; and a reproduction unit for reproducing the scene on the basis of the first object data and the second object data, in which scene reproduction based on the first object data is performed after reception of the first object data has been completed, while scene reproduction based on the second object data is performed in parallel with the reception of the second object data. Therefore, extreme increase in the data transmission quantity during scene reproduction is avoided.

According to a fourteenth aspect of the present invention, in the data receiving apparatus of the thirteenth aspect, control information for controlling transmission of the object data and reproduction of the objects is received by the first receiving unit, as initial data transmitted to the receiving end in the transmission process for data corresponding to the scene; and the object data corresponding to each object is received by one of the first and second receiving units, according to transmission mode identification information which is included in the control information and indicates that the object data is to be received by the first receiving unit or the second receiving unit. Therefore, in addition to the effect of minimizing the consumption of the transmission band of the network, this apparatus can prevent image reproduction at the receiving end from becoming unreliable due to transmission error.

According to a fifteenth aspect of the present invention, there is provided a data receiving apparatus for receiving scene data for reproducing a scene, transmitted from the transmitting end, and reproducing the scene. This apparatus comprises a first receiving unit for receiving first data which is transmitted as a part of the scene data in accordance with a first transmission protocol that does not necessarily perform retransmission against transmission errors; a second receiving unit for receiving second data which is transmitted as a part of the scene data in accordance with a second transmission protocol that performs retransmission against transmission errors. The second receiving unit receives, as the second data, scene description information and object relevant information, the scene description information indicating the hierarchy of the respective objects constituting the scene, by object identifiers corresponding to the respective objects, and the object relevant information indicating additional information relating to the respective objects, in association with the object identifiers of the respective objects. Therefore, this apparatus can prevent image reproduction at the receiving end from becoming unstable due to transmission error.

According to a sixteenth aspect of the present invention, there is provided a data receiving apparatus for receiving object data for reproducing objects constituting a scene, transmitted object by object from the transmitting end, and reproducing the scene. This apparatus comprises a first receiving unit for receiving first data which is transmitted as a part of the scene data in accordance with a first transmission protocol that does not necessarily perform retransmission against transmission errors; and a second receiving unit for receiving second data which is transmitted as a part of the scene data in accordance with a second transmission protocol that performs retransmission against transmission errors. The second receiving unit receives, as the second data, table information transmitted from the transmitting end, the table information associating an object identifier given to each object for identifying the object, with location information indicating the location of object data corresponding to the object. Therefore, even when some transmission error occurs, each object can be associated with the location of object data corresponding to the object on the basis of the table information.

According to a seventeenth aspect of the present invention, in the data receiving apparatus of the sixteenth aspect, the second receiving unit receives the table information as information included in control information for controlling transmission of object data corresponding to the respective objects and reproduction of the objects, the control information being received first as the scene data corresponding to one scene. Therefore, even when some transmission error occurs, each object can be associated with the location of object data corresponding to the object on the basis of the table information.

According to an eighteenth aspect of the present invention, in the data receiving apparatus of the sixteenth aspect, the second receiving unit receives the table information as information included in object relevant information transmitted from the transmitting end, the object relevant information indicating additional information relating to the respective objects, in association with object identifiers of the respective objects. Therefore, even when some transmission error occurs, each object can be associated with the location of the object data corresponding to the object on the basis of the table information.

BRIEF DESCRIPTION OF THE DRAWINGS

FIG. 2 is a diagram illustrating the contents of SDP information to be transmitted as control information in the data transmission system of the first embodiment.

FIG. 3 is a diagram for explaining the relationship among the contents of SDP information, the contents of scene description (SD), and the reproduced scenes.

FIGS. 8(a)–8(d) are diagrams illustrating objects constituting the composite image, wherein FIG. 8(a) shows a background, FIG. 8(b) shows a first foreground, FIG. 8(c) shows a second foreground, and FIG. 8(d) shows a third foreground.

FIGS. 11(a) and 11(b) are diagrams illustrating a moving picture file linked with the home page, wherein FIG. 11(a) shows a scene according to image data treated in the standard previous to MPEG4, and FIG. 11(b) shows a scene according to image data treated in MPEG4.

FIGS. 12(a)–12(d) are diagrams illustrating objects constituting a composite image as the scene shown in FIG. 11(b), wherein FIG. 12(a) shows a background as a still picture, FIG. 12(b) shows a first foreground as a cyclic moving image, and FIGS 12(c) and 12(d) show second and third foregrounds as moving pictures, respectively.

DETAILED DESCRIPTION OF THE PREFERRED EMBODIMENTS

Hereinafter, the inventor's viewpoint and the fundamental principle will be described.

The inventors of the present invention have discovered that, in the process of transmitting image data based on MPEG4, when control information which may cause unreliable scene reproduction due to transmission errors (i.e., SDP information, IOD information, SDS information, ODS information, etc.) is transmitted according to a highly reliable protocol that performs data retransmission or the like when a transmission error has occurred, bad influences of the transmission error on the scene reproduction can be minimized.

Further, the inventors of the present invention have discovered the following effect. That is, in the case of transmitting image data (scene data) of a scene which is reproduced by compositing pre-download type object data and stream type object data at the receiving end, identifiers for identifying the data formats of the image data (object data) corresponding to the respective objects constituting the scene are described in control information or the like which is to be downloaded initially in the scene data transmission process, and the identifiers are downloaded before starting scene reproduction at the receiving end, whereby the quantity of data transmitted during the scene reproduction can be reduced.

The download type object data is image data of an object, such as a background still picture, a cyclic moving picture, audio, or text. Once the download type object data has been transmitted to the receiving end, the receiving end can utilize it until a scene change occurs. Such object data is transmitted such that reproduction of the scene is performed on the basis of the data at the receiving end after the transmission has been completed. On the other hand, the stream type object data is image data of a moving picture (object) which changes with time, and it takes time to download all the data from the change of one scene to the change of next scene. Such object data is transmission such that the scene is reproduced on the basis of the data at the receiving end during the transmission.

Further, the inventors of the present invention have discovered that, by transmitting table information which associates an object identifier given to each object for identifying the object with image data (object data), of each object, the receiving end can reproduce the scene by associating each object with the object data corresponding to the object.

Hereinafter, embodiments of the present invention will be described.

Embodiment 1

Figure 1:
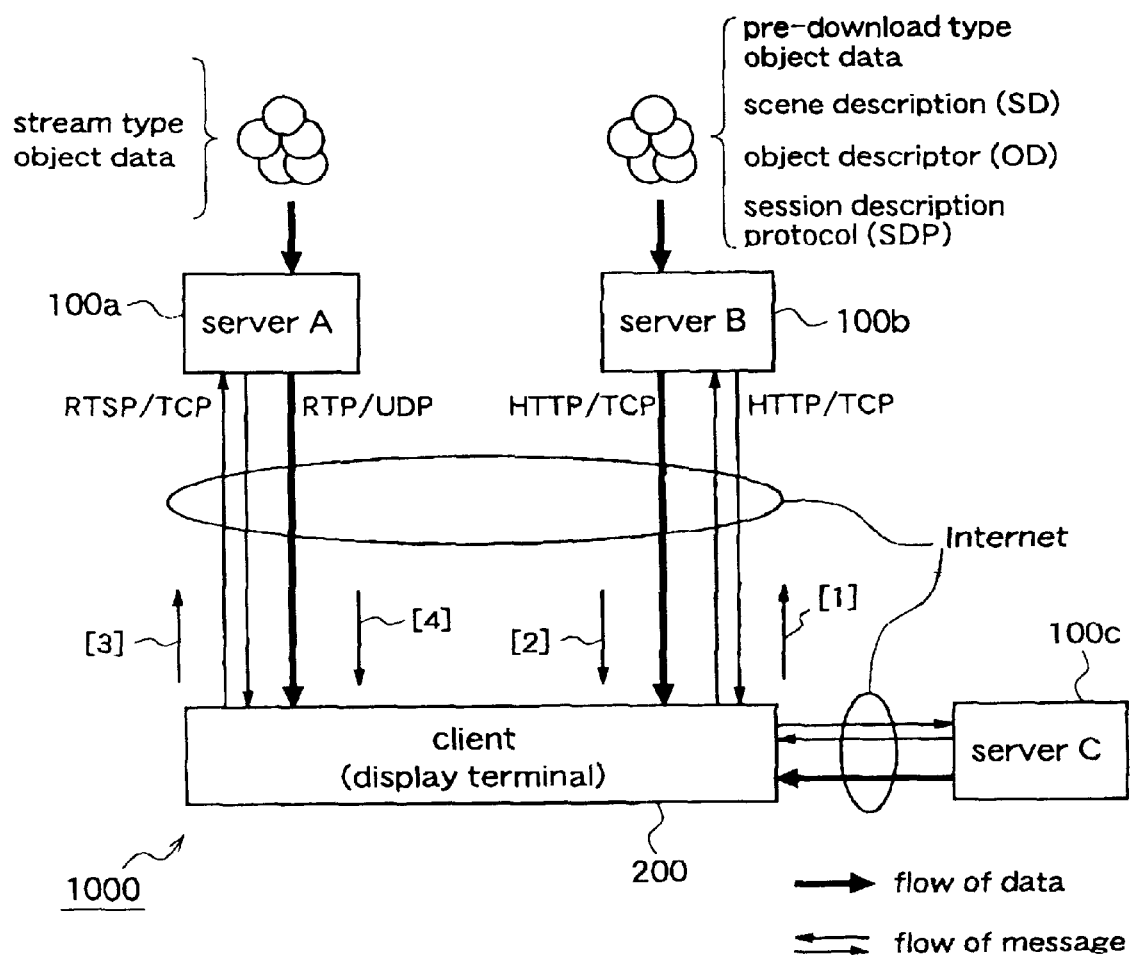
FIG. 1 is a diagram for explaining a data transmission system according to a first embodiment of the present invention, illustrating the entire structure of the system.

FIGS. 1~5 are diagrams for explaining a data transmission system 1000 according to a first embodiment of the present invention. FIG. 1 is a schematic diagram illustrating the entire structure of the data transmission system.

The data transmission system 1000 of this first embodiment performs data transmission from a predetermined server to a client terminal according to one of the following two processes: a download type transmission process in which download type object data among object data, such as video data, audio data, and text data, is transmitted such that reproduction of information is performed at the receiving end on the basis of the download type object data after transmission of the data has been completed; and a stream type transmission process in which stream type object data among the object data is transmitted such that reproduction of information is performed at the receiving end during transmission of the stream type object data. The download type (hereinafter also referred to as pre-download type) object data is object data constituting a scene and having a relatively small quantity of data, and the stream type object data is object data constituting a scene and having a relatively large quantity of data.

This system 1000 includes first to third servers 100a, 100b, and 100c having predetermined data, and a client (display terminal) 200 which requests each server to send necessary data. These servers 100a~100c are connectable to the client 200 through the Internet. The first server (server A) 100a holds stream type video data, the second server (server B) 100b holds pre-download type video data, IOD information, and SDP information, and the third server (server C) 100c holds data of a predetermined home page. The video data are image data for reproducing objects constituting a scene. The IOD information includes SDS information which comprises scene descriptions SD1~SDn corresponding to predetermined times t1~tn in one scene, and ODS information which comprises object descriptors OD corresponding to all objects constituting one scene.

Further, in the SDP information held by the second server 100b, as shown in FIG. 2, initially, the URL of the IOD information and the transmission mode thereof are described in association with the data type (IOD). Thereafter, the URL of the ODS information and the transmission mode thereof are described in association with the data type (ODS) and, furthermore, the URL of the SDS information and the transmission mode thereof are described in association with the data type (SDS). The transmission modes of the IOD information, the ODS information, and the SDS information are download type.

Further, in the SDP information, the URL of each entity data and the transmission mode thereof are described in association with the data type (video, audio, or text) and, further, an identifier of the object descriptor corresponding to each entity data is described. With respect to the entity data corresponding to the object such as background still picture, a cyclic moving picture, text, or audio, the transmission mode of the entity data is described as download type. With respect to the entity data corresponding to a normal moving picture, the transmission mode of the entity data is described as stream type. FIG. 3 shows the specific contents of the SDP information. In FIG. 3, the specific descriptions of the data types are omitted.

In the SDP information, as shown in FIGS. 2 and 3, the data type is described in the form of m=···, and the transmission mode and the URL are described in the form of a=···, following the data type (m=···). Further, the object identifier is described in the form of a=···, following the transmission mode and the URL (a=···). Table information which associates the object identifier for identifying one object with the URL indicating the location of object data corresponding to this object, is composed of the transmission mode and the URL (a=···) which follow one data type (m=···), and the object identifier (a=···) which follows the transmission mode and the URL (a=···).

Figure 13:
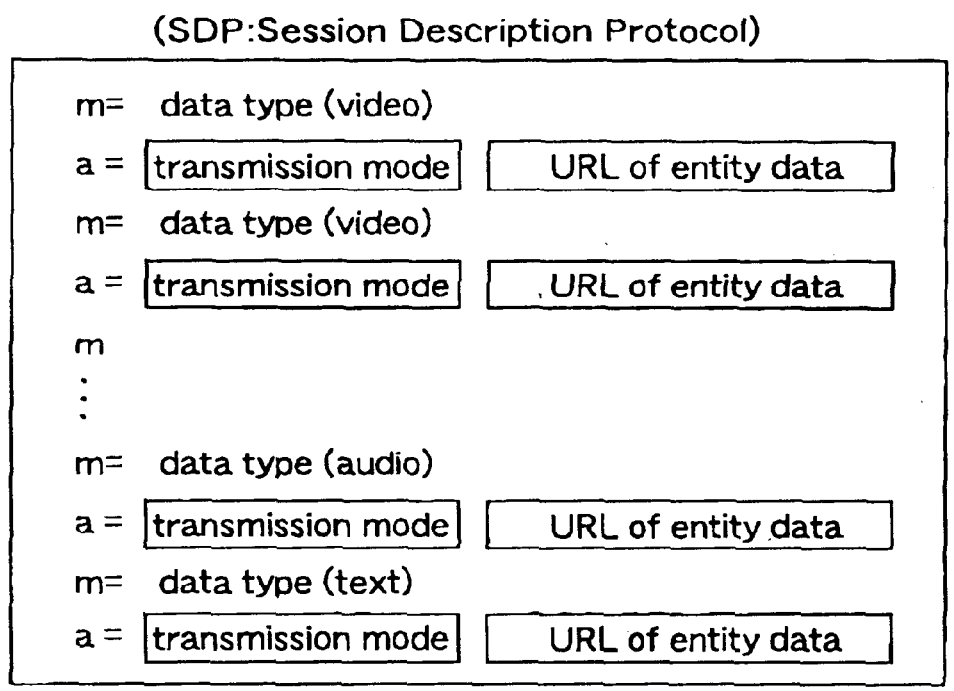
FIGS. 13(a) and 13(b) are diagrams for explaining the contents of SDP information and IOD information, respectively, which are included in the image data treated in MPEG4.
Figure 13:
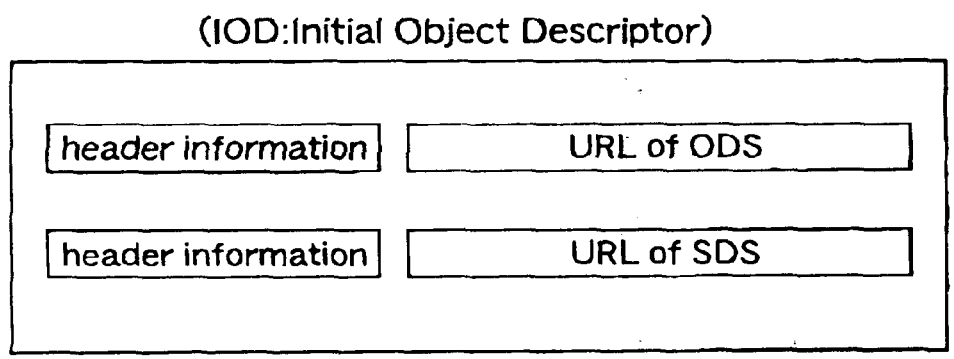
Figure 14:
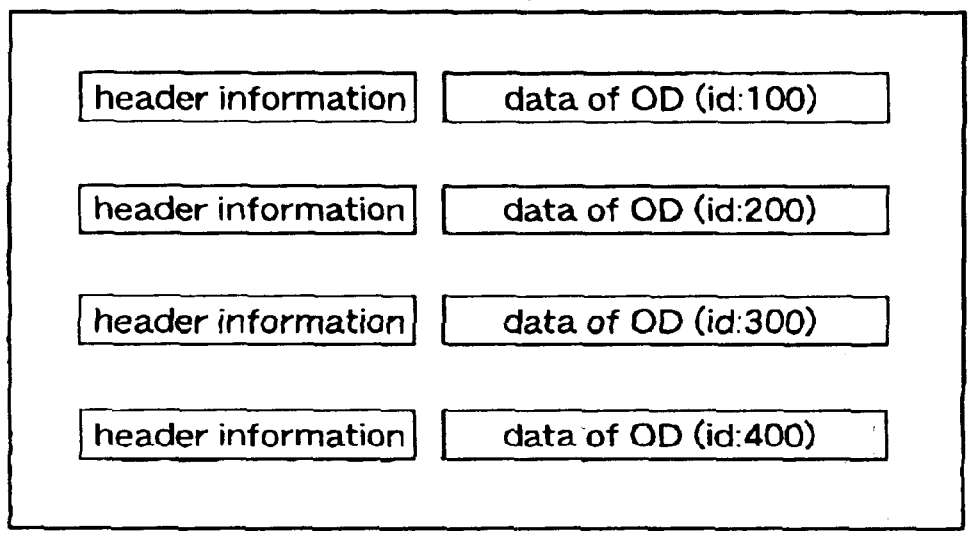
FIGS. 14(a) and 14(b) are diagrams for explaining the contents of ODS information and SDS information, respectively which are included in the IOD information.
Figure 14:
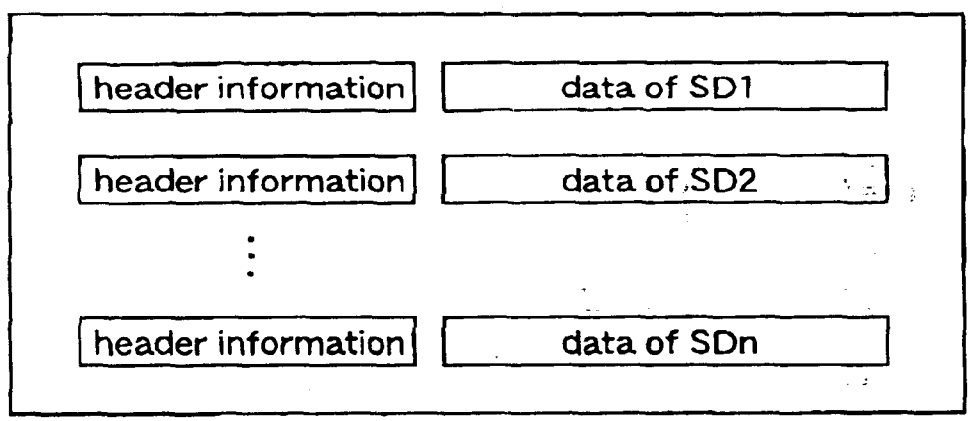

Further, in the IOD information, as shown in FIG. 13(*b*), data of ODods (object descriptor) corresponding to the ODS information itself and data of ODsds (object descriptor) corresponding to the SDS information itself are described with the corresponding header information, respectively. Further, in the ODS information, as shown in FIG. 14(*a*), the data of object descriptors (OD) corresponding to the respective objects constituting one scene are described together with the corresponding header information. Further, in the SDS information, as shown in FIG. 14(*b*), data of scene descriptions SD1~SDn indicating the scene construction of one scene corresponding to predetermined times t1~tn are described together with the corresponding header information.

Figure 15:
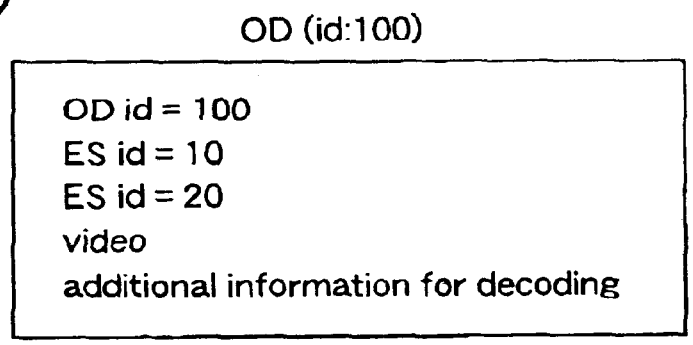
FIGS. 15(a) and 15(b) are diagrams for explaining object descriptor OD (id: 100) and scene description SD1 (time t1), respectively, which are treated in MPEG4.
Figure 15:
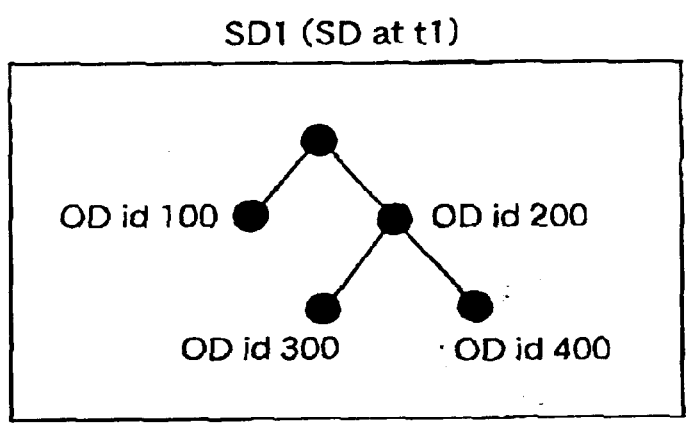
Figure 16:
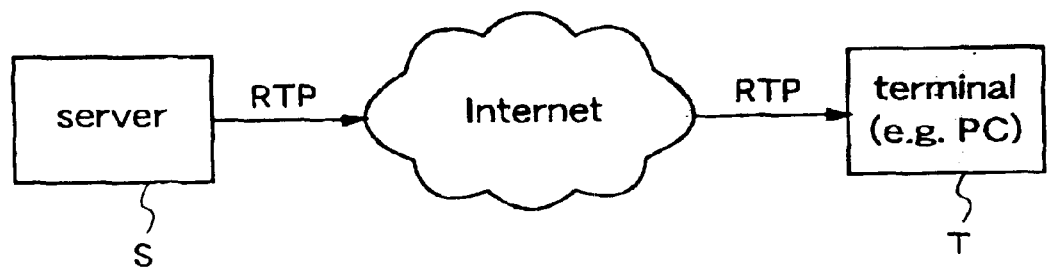
FIG. 16 is a diagram illustrating the conventional data transmission system for performing data transmission between a server and a terminal through the Internet, according to RTP.

Further, in the object descriptor (OD) of the object identifier (id=100), as shown in FIG. 15(*a*), ODid=100 as the value of the object identifier (id), and ESid=10 and ESid=20 as elementary stream identifiers (id) are described and, furthermore, an identifier "Video" which indicates that this object is video data (between video data and audio data), and additional information, for example, information for decoding coded entity data, are described. The contents of the object descriptors (OD) having other object identifiers are similar to that shown in FIG. 15(*a*). Further, the description of ODods (object descriptor) corresponding to the ODS information itself and the description of ODsds (object descriptor) corresponding to the SDS information itself are similar to that shown in FIG. 15(*a*).

Furthermore, in the scene description SD1, as shown in FIG. 15(*b*), the hierarchy of the objects constituting the scene at time t1 is described. The contents of the scene descriptions SD2~SDn at times t2~tn are similar to that shown in FIG. 15(*b*).

Next, the operation of the data transmission system will be described.

Figure 10:
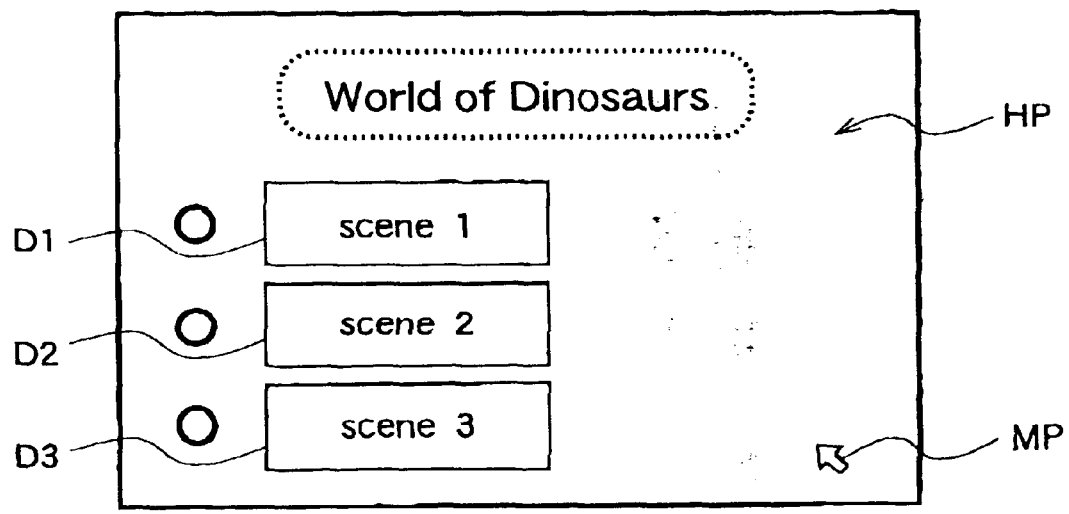
FIG. 10 is a diagram illustrating a screen of a home page obtained by the network system.

For example, in the state where the home page HP held by the third server 100*c* is displayed on the display unit of the client terminal 200 as shown in FIG. 10, when the user selects the character string "scene 1" in this home page HP by using a mouse pointer MP and clicks the mouse, a request for the SDP information corresponding to the scene 1 is output to the second server 100*b* which holds the SDP information linked to the character string "scene 1". Thereby, the SDP information is transmitted from the second server 100*b* to the client terminal 200.

Then, based on the contents of the SDP information (refer to FIG. 2(*b*)), the client terminal 200 starts the process to obtain the IOD information, the ODS information, the SDS information, and the entity data (object data) of the respective objects.

Initially, the client terminal 200 outputs a request for the IOD information to the server B which holds the IOD information described at the beginning of the SDP information, by specifying the location (URL) and the transmission mode (download type transmission) of the IOD information. Then, the server B transmits the requested IOD information to the client terminal 200 by download type transmission. Thereby, the client terminal 200 receives the IOD information from the server B. In this first embodiment, the download type transmission employs HTTP (Hyper Text Transfer Protocol) based on TCP (Transport Control Protocol). The IOD information contains data of ODiod corresponding to the ODS itself, and data of ODsds corresponding to the SDS itself.

Next, the client terminal 200 outputs a request for the ODS information and the SDS information which are described in the SDP information, to the server B which holds the ODS information and the SDS information, by specifying the locations (URL) and the transmission mode (download type transmission). Then, the server B transmits the requested ODS information and SDS information to the client terminal 200 by download type transmission. Thereby, the client terminal 200 receives the ODS information and the SDS information from the server B. The ODS information is information including the object descriptors (OD) of all objects corresponding to one scene, and the SDS information is information including scene descriptions SD1~SDn corresponding to predetermined times t1~tn in one scene. In this first embodiment, the request and acquisition of the ODS information and the SDS information are performed according to the HTTP based on the TCP.

Further, the client terminal 200 outputs a request for the image data (entity data) of each object, on the basis of the contents of the SDP information, by specifying the transmission mode.

To be specific, initially, the client terminal 200 outputs a request for the image data (entity data) corresponding to the object such as background still picture or a cyclic moving picture, to the second server 100*b*, by specifying the download type transmission as the transmission mode (the process shown by [1] in FIG. 1). Then, the server 100*b* transmits the requested data to the client terminal 200 by the specified transmission mode, i.e., the HTTP based on the TCP (the process shown by [2] in FIG. 1).

Thereby, the IOD information, the ODS information (object descriptors OD of all the objects constituting one scene), and the SDS information (scene descriptions SD1~Sdn at predetermined times in one scene) are transmitted according to the highly reliable transmission protocol and, further, the image data of the download type objects are transmitted before transmission of the image data of the stream type objects.

Subsequently, the client terminal 200 analyzes the ODS information according to the object descriptor ODods to obtain the object descriptors OD (id=100, 200, 300, 400) of all objects constituting one scene. Further, it analyzes the SDS information according to the object descriptor ODsds to obtain the scene descriptions SD1~SDn at predetermined times in one scene. Thereafter, the client terminal 200 performs decoding and composition of the entity data of the respective objects on the basis of the object descriptors OD (id=100, 200, 300, 400) obtained from the ODS information and the scene descriptions SD1~SDn obtained from the SDS information, thereby reproducing the image corresponding to one scene.

Thereafter, the client terminal 200 outputs a request for the image data (entity data) corresponding to the object as a moving picture, to the first server 100*a*, by specifying the stream type transmission as the transmission mode (the process shown by [3] in FIG. 1). Then, the server 100*b* transmits the requested data to the client terminal 200 by the specified stream type transmission (the process shown by [4] in FIG. 1). In this first embodiment, the stream type transmission is performed according to RTP (Real Type Transport Protocol) based on UDP (User Datagram Protocol).

Hereinafter, the data transmission process between the server and the client terminal in the data transmission system of this first embodiment will be described in more detail.

Figure 4:
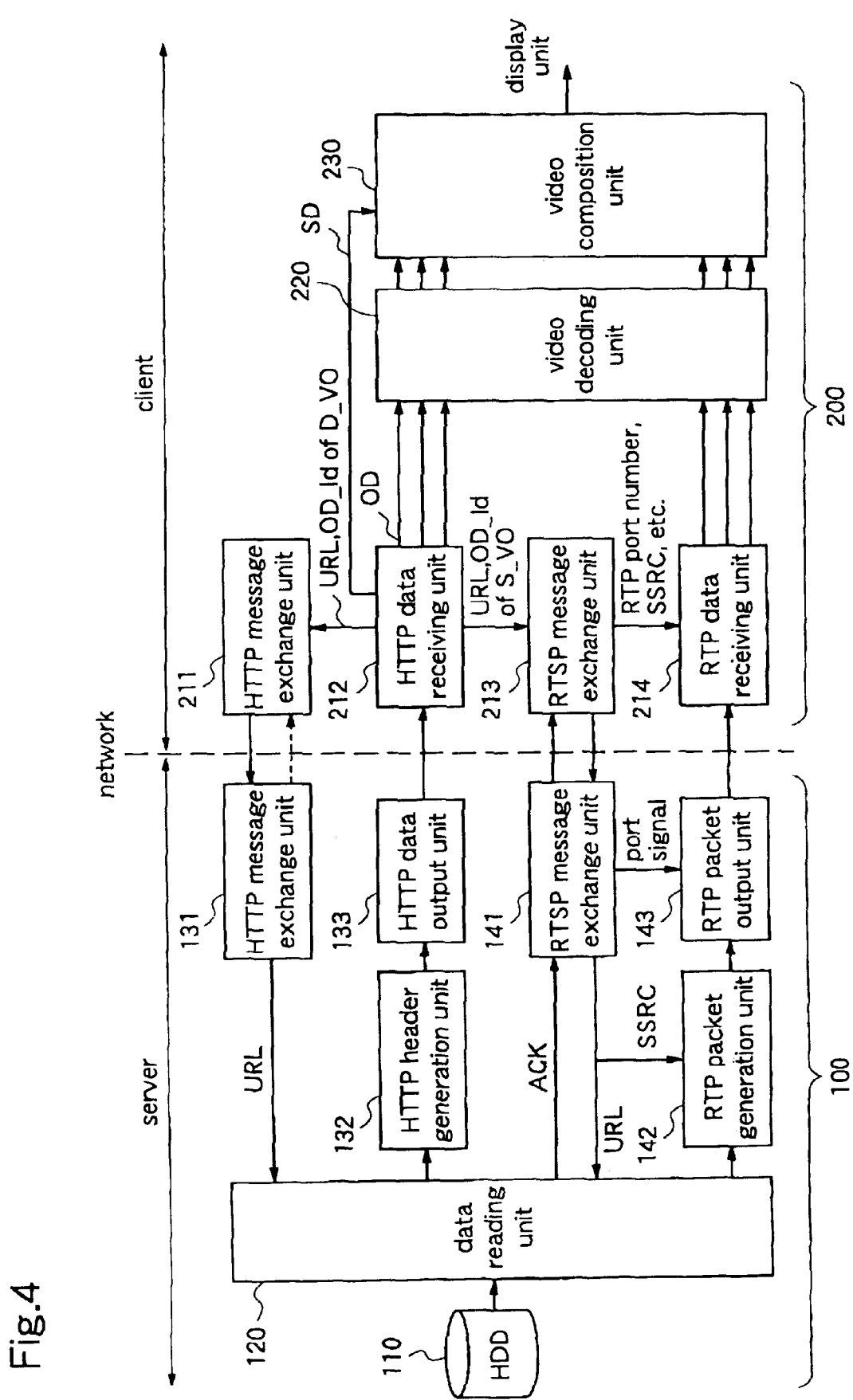
FIG. 4 is a block diagram illustrating the constructions of a server (data transmission apparatus) and a client terminal (data receiving apparatus) in the data transmission system according to the first embodiment.

FIG. 4 is a diagram for explaining the construction of the server 100 and the client terminal 200 in the system. In FIG. 4, for convenience's sake, the server 100 is shown as the first and second servers 100*a* and 100*b* shown in FIG. 1.

The server 100 includes a hard disk (HDD) 110, an HTTP message exchange unit 131, and an RTSP message exchange unit 141. The hard disk 110 contains the entity data of the respective objects (object data), the SDP information, the ODS information, the SDS information, and the like. The HTTP message exchange unit 131 exchanges an message transmitted by the HTTP (HTTP message) with the client terminal 200, and outputs the URL of requested data, which is included in the message. The RTSP message exchange unit 141 exchanges a message transmitted by the RTSP (RTSP message) with the client terminal 200, and outputs the URL of requested data and the SSRC (channel id of the RTP), which are included in the message. Further, the RTSP message exchange unit 141 receives an acknowledgment (ACK) of the URL from a data reading unit 120 which is described later.

The server 100 further includes a data reading unit 120, an HTTP header generation unit 132, and an HTTP data output unit 133. The data reading unit 120 reads data from the hard disk 110 on the basis of the locations (URL) of the requested data from the exchange units 131 and 141. The HTTP header generation unit 132 generates an HTTP header corresponding to the read data. The HTTP data output unit 133 adds the HTTP header to the read data and outputs the data.

The server 100 further includes an RTP packet generation unit 142 and an RTP packet output unit 143. The RTP packet generation unit 142 generates an RTP packet corresponding to the read data, and gives the SSRC specified by the exchange unit 141 to the RTP packet. The RTP packet output unit 143 receives the RTP packet with the SSRC, and outputs the RTP packet in accordance with a port signal from the message exchange unit 141.

The client terminal 200 includes an HTTP data receiving unit 212 and an HTTP message exchange unit 211. The HTTP data receiving unit 212 receives the output from the HTTP data output unit 133 of the server 100, and outputs the URL of the entity data of each object and the object descriptor id thereof and, further, outputs the object descriptor OD. The HTTP message exchange unit 211 receives the output from the data receiving unit 212 (the URL of the entity data of the download type object), exchanges an HTTP message with the HTTP message exchange unit 131 of the server 100, and outputs the URL.

Further, the client terminal 200 includes an RTSP message exchange unit 213 and an RTP data receiving unit 214. The RTSP message exchange unit 213 receives the output from the HTTP data receiving unit 212 (the URL of the entity data of the stream type object) and the object descriptor id, exchanges an RTSP message with the RTSP message exchange unit 141 of the server 100, and outputs the RTP port number, the SSRC, and other data. The RTP data receiving unit 214 receives the RTP packet from the RTP packet output unit 143 of the server 100, and outputs the RTP data on the basis of the RTP port number, the SSRC, and other data which are output from the message exchange unit 213.

Further, the client terminal 200 includes a video decoding unit 220 and a video composition unit 230. The video decoding unit 220 decodes the coded image data (entity data) of each object on the basis of the output from the HTTP data receiving unit 212 and the output from the RTP receiving unit 214. The video composition unit 230 composites the decoded image data of the respective objects on the basis of the scene description information SD from the HTTP data receiving unit 212, and outputs reproduced image data corresponding to one scene to the display unit.

Next, a description will be given of the operations of the server 100 and the client terminal 200 during the data transmission process between the server 100 and the client terminal 200.

Figure 5:
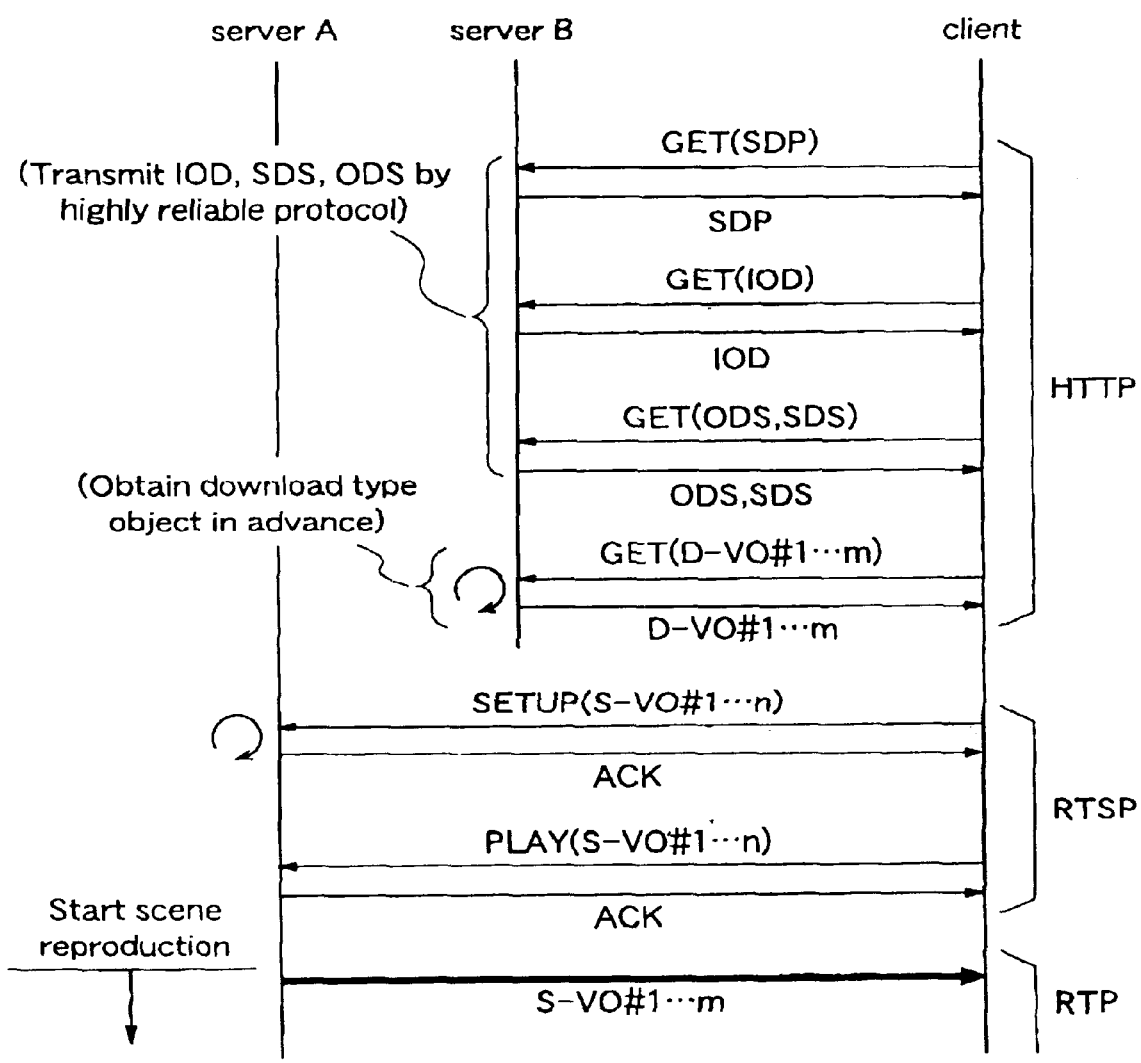
FIG. 5 is a diagram for explaining the procedure of session setup in the data transmission system according to the first embodiment.

FIG. 3 is a diagram showing the contents of the SDP information, the contents of the scene description information SD, and the relation of the scenes to be reproduced, which are treated in the data transmission system. FIG. 5 is a diagram for explaining the procedure of session set up in the data transmission system, i.e., the procedure to obtain image data of the respective objects constituting one scene.

Hereinafter, a description will be given of the case where the client terminal 200 obtains the respective objects ob1~ob4 constituting the composite image G1 shown in FIG. 11(b), and reproduces and displays the composite image G1.

Figure 11:
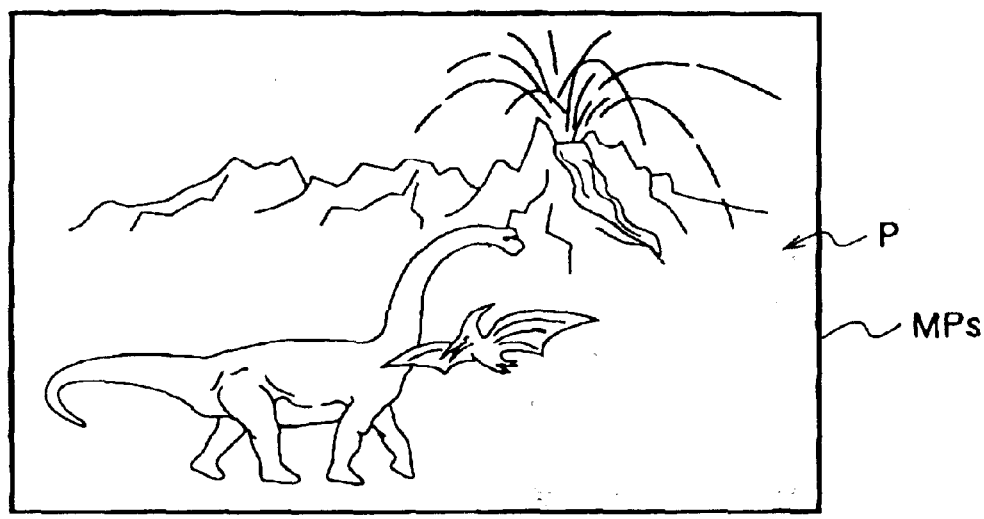
Figure 11:
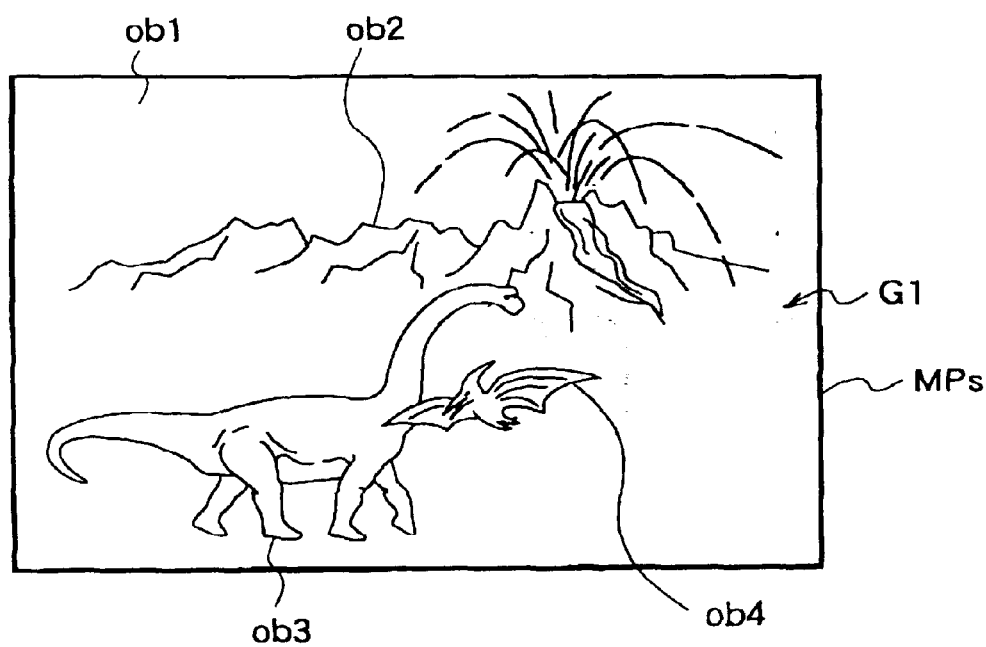
Figure 12:
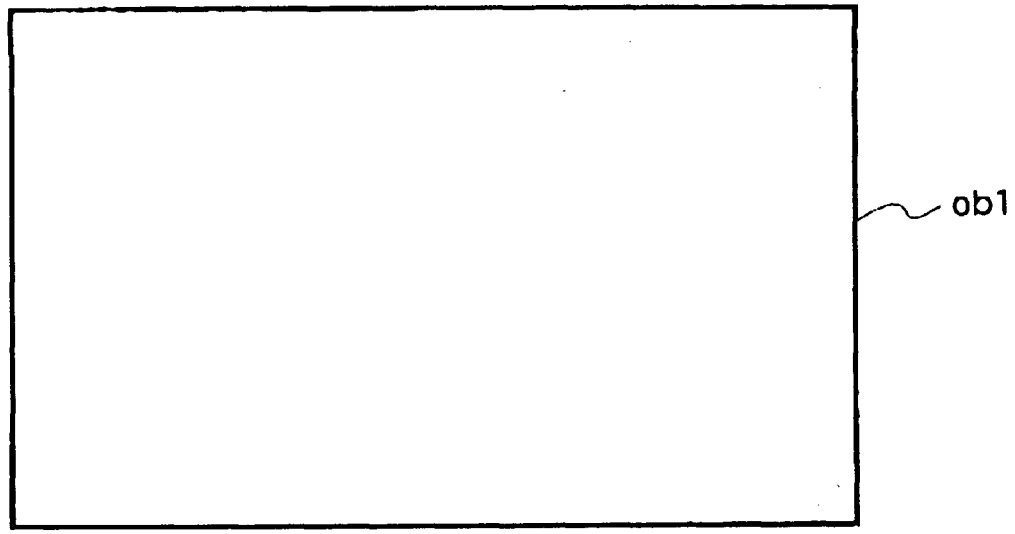
Figure 12:
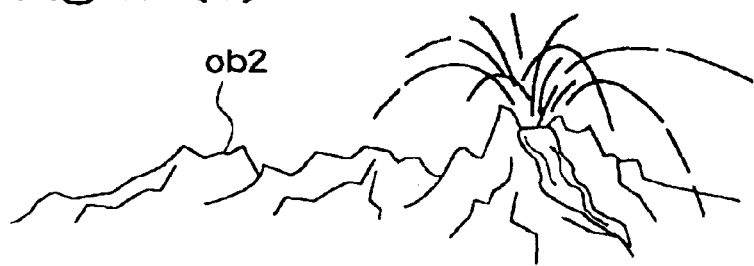
Figure 12:
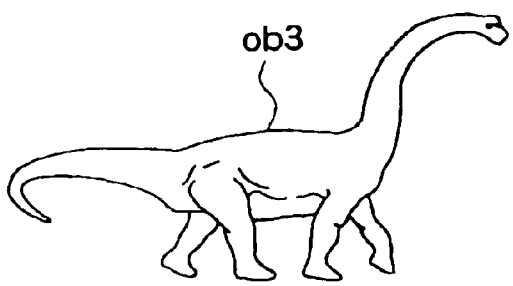
Figure 12:

Accordingly, in FIG. 3, the SDP information indicates that the object ob1 having the object descriptor (id=100) is the background still picture in the composite image G1 shown in FIG. 11(b), and its entity data D_VO#1 is data stored in the server B, for which a transmission request is to be made according to the protocol (HTTP) corresponding to the download type transmission. Further, the SDP information indicates that the object ob2 having the object descriptor (id=200) is the cyclic moving picture (volcano) as the first foreground in the composite image G1 shown in FIG. 11(b), and its entity data D_VO#2 is data stored in the server B, for which a transmission request is to be made according to the protocol (HTTP) corresponding to the download type transmission. Further, the SDP information indicates that the objects ob3 and ob4 having the object descriptors (id=300, 400) are the moving picture (big dinosaur) as the second foreground image and the moving picture (small dinosaur) as the third foreground image in the composite image G1 shown in FIG. 11(b), respectively, and their entity data S_VO#1 and S_VO#2 are data stored in the server A, for which transmission requests are to be made according to the protocol (RTP) corresponding to the stream type transmission.

Further, in FIG. 3, the scene description (SD) indicates the hierarchy of the objects constituting the scene G1. To be specific, assuming that the scene G1 corresponds to the first layer of the hierarchy, the object having the ODid of 100 and the object having the ODid of 200 belong to the layer lower than the first layer, i.e., the second layer, and the object having the ODid of 300 and the object having the ODid of 400 belong to the layer lower than the object (ODid=200) in the second layer, i.e., the third layer.

In the client terminal 200, when the user instructs the client terminal 200 to obtain the scene (composite image) G1 shown in FIG. 11(b), the HTTP message exchange unit 211 outputs a request for the SDP information, by specifying the URL of the SDP information, to the HTTP message exchange unit 131 of the server 100. Then, the exchange unit 131 of the server 100 transmits the URL of the SDP information to the data reading unit 120, and the data reading unit 120 reads the SDP information from the hard disk 110. The read SDP information is given a header which is generated in the HTTP header generation unit 132, and the SDP information with the header is transmitted from the HTTP data output unit 133 to the client terminal 200. The request and output of the SDP information are performed according to the HTTP.

When the SDP information output from the data output unit 133 of the server 100 is received by the HTTP data receiving unit 212 of the client terminal 200, the receiving unit 212 analyzes the SDP information.

Initially, the receiving unit 212 instructs the message exchange unit 211 to make a request for the IOD information which is described at the beginning of the SDP information, and the message exchange unit 211 outputs a request for the IOD information, by specifying the URL of the IOD information, to the HTTP message exchange unit 131 at the server end. Thereby, the IOD information is output from the output unit 133 at the server, end to the receiving unit 212 at the client end. The request and output of the IOD information are also performed according to the HTTP.

When the IOD information output from the data output unit 133 of the server 100 is received by the HTTP data receiving unit 212 of the client terminal 200, the receiving unit 212 analyzes the IOD information, thereby obtaining the data of ODods corresponding to the ODS information and the data of ODsds corresponding to the SDS information.

Next, the receiving unit 212 at the client end instructs the message exchange unit 211 to make a request for the ODS information and the SDS information which are described after the IOD information in the SDP information, and the message exchange unit 211 outputs a request for the ODS information and the SDS information, by specifying their locations (URL), to the HTTP message exchange unit 131 at the server end. Thereby, the ODS information and the SDS information are output from the output unit 133 at the server end to the receiving unit 212 at the client end. The request and output of the ODS information and the SDS information are also performed according to the HTTP.

When the ODS information and the SDS information output from the data output unit 133 of the server 100 are received by the HTTP data receiving unit 212 of the client terminal 200, the receiving unit 212 analyzes the ODS information and the SDS information in accordance with their object descriptors ODods and ODsds, thereby obtaining the object descriptors DS of all objects corresponding to one scene, and the scene descriptions SD1~SDn corresponding to times t1~tn of the scene. These ODS information and SDS information are transmitted from the server B to the client end, in the same manner as described for the SDP information and the IOD information. The request and acquisition of the ODS information and the SDS information are performed according to the HTTP based on the TCP.

Thereby, the client end obtains the object descriptors (OD) of all objects constituting the selected scene, and the scene descriptions SD1~SDn corresponding to times t1~tn of the scene. The object descriptors (OD) are output to the video decoding unit 220 while the scene descriptions SD1~SDn are output to the video composition unit 230.

Thereafter, at the client end, the HTTP data receiving unit 212 and the HTTP message exchange unit 211 make a request for the entity data D_VO#1 of the download type object ob1, on the basis of the contents of the SDP information, by specifying that the data transmission should be performed by the download type transmission using the HTTP, as well as the URL of the entity data. When this request has arrived at the HTTP message exchange unit 131 of the server B, the exchange unit 131 transmits the URL of the entity data D_VO#1 to the data reading unit 120, and the data reading unit 120 reads the entity data D_VO#1 from the hard disk 110. The entity data D_VO#1 output from the data reading unit 120 is given a predetermined header by the HTTP header generation unit 132, and the entity data D_VO#1 with the header is output from the HTTP data output unit 133 to the client end.

When the entity data D_VOL#1 has been received by the HTTP data receiving unit 212 at the client end, request and acquisition of the entity data D_VOL#2 of the next object are performed in the same manner as described for the entity data D_VOL#1. The entity data received by the receiving unit 212 are successively supplied to the video decoding unit 220 and then output to the video composition unit 230.

Next, in the client terminal 200, the RTSP message exchange unit 213 and the RTSP data receiving unit 214 make a request for the image data (entity data) S_VO#1 corresponding to the object as a moving picture, on the basis of the SDP information, by specifying that the data transmission should be performed by the stream type transmission using the RTP, as well as the URL of the entity data, the RTP port signal, and the SSRC.

When the request has arrived at the RTSP message exchange unit 141 of the server B, the exchange unit 141 outputs the URL of the entity data S_VO#1 to the data reading unit 120. At this time, the SSRC is output to the RTP packet generation unit 142 while the port signal is output to the RTP packet output unit 143.

Then, the data reading unit 120 checks as to whether the entity data exists in the specified URL or not. When the entity data exists in the URL, an ACK signal is output to the RTSP message exchange unit 141.

Next, a request for the image data (entity data) S_VO#2 is made by specifying that the data transmission should be performed by the stream type transmission using the RTP, as well as the URL of the entity data, the RTP port signal, and the SSRC. As described above, when the entity data exists in the specified URL, an ACK signal is output to the RTSP message exchange unit 141.

In this way, successive setup is performed for the entity data of the stream type object.

When a PLAY signal (reproduction start signal) for each stream type object is transmitted from the RTSP message exchange unit 213 at the client end to the RTSP message exchange unit 141 at the server end in accordance with the user's operation, the entity data of each stream type object is transmitted from the server to the client. The PLAY signals (reproduction start signals) for the respective stream type objects may be transmitted object by object, or in a lump.

That is, the data reading unit 120 reads the above-described entity data S_VOL#1 and S_VO#2 from the hard disk 110, and the read entity data S_VO#1 and S_VOL#2 are output from the data reading unit 120 to the RTP packet generation unit 142. In the RTP packet generation unit 142, the entity data S_VO#1 and S_VO#2 are packetized, and each RTP packet is given the SSRC as the channel id specified by the client. These RTP packets are output from the RTP packet output unit 143 to the client end according to the RTP.

When the entity data S_VO#1 and S_VO#2 have been received by the RTP data receiving unit 214 at the client end, these entity data are successively taken from the packets on the basis of the port signal, the SSRC, and other additional information, and decoded by the video decoding unit 220, and thereafter, output to the video composition unit 230.

In the video composition unit 230, the download type entity data D_VO#1 and D_VO#2 and the stream type entity data S_VO#1 and S_VO#2 are composited according to the scene description information. Then, scene data corresponding to one scene is output to the display unit, and the scene is displayed.

As described above, according to the first embodiment of the present invention, among the image data (entity data)

corresponding to the respective object constituting one scene, the image data corresponding to the objects as a still picture and a cyclic moving picture are transmitted before reproduction of the scene data corresponding to one scene is started at the receiving end. Therefore, extreme increase in the data transmission quantity during scene reproduction is avoided, and the consumption of the transmission band of the network is minimized.

Further, the control information (SDP information) for performing transmission and reproduction of the image data corresponding to the respective objects includes the transmission mode identification information indicating whether the object data corresponding to each object should be transmitted by the download type transmission or the stream type transmission, and the SDP information is transmitted as the initial transmission data to the receiving end in the transmission process for the scene data corresponding to one scene, by the transmission mode using the highly reliable protocol, while the scene description information (SDS) and the object relevant information (ODS) are transmitted by the transmission mode using the highly reliable protocol. Therefore, reliable image reproduction at the receiving terminal is assured.

Further, when the scene data corresponding to one scene composed of plural objects is transmitted object by object from the transmitting end to the receiving end, the SDP information includes the table information which associates the object identifier given to each object for identifying the object with the URL corresponding to each object which indicated the location of the object data for reproduction and display of the object. Therefore, at the receiving end, each object can be associated with the URL of the corresponding object data, on the basis of the table information.

While in this first embodiment the ODS information (i.e., object descriptors OD of all objects) and the SDS information (scene descriptions SD1~SDn at times t1~tn) are obtained separately from the server, these information may be obtained as one file from the server.

Embodiment 2

Figure 6:
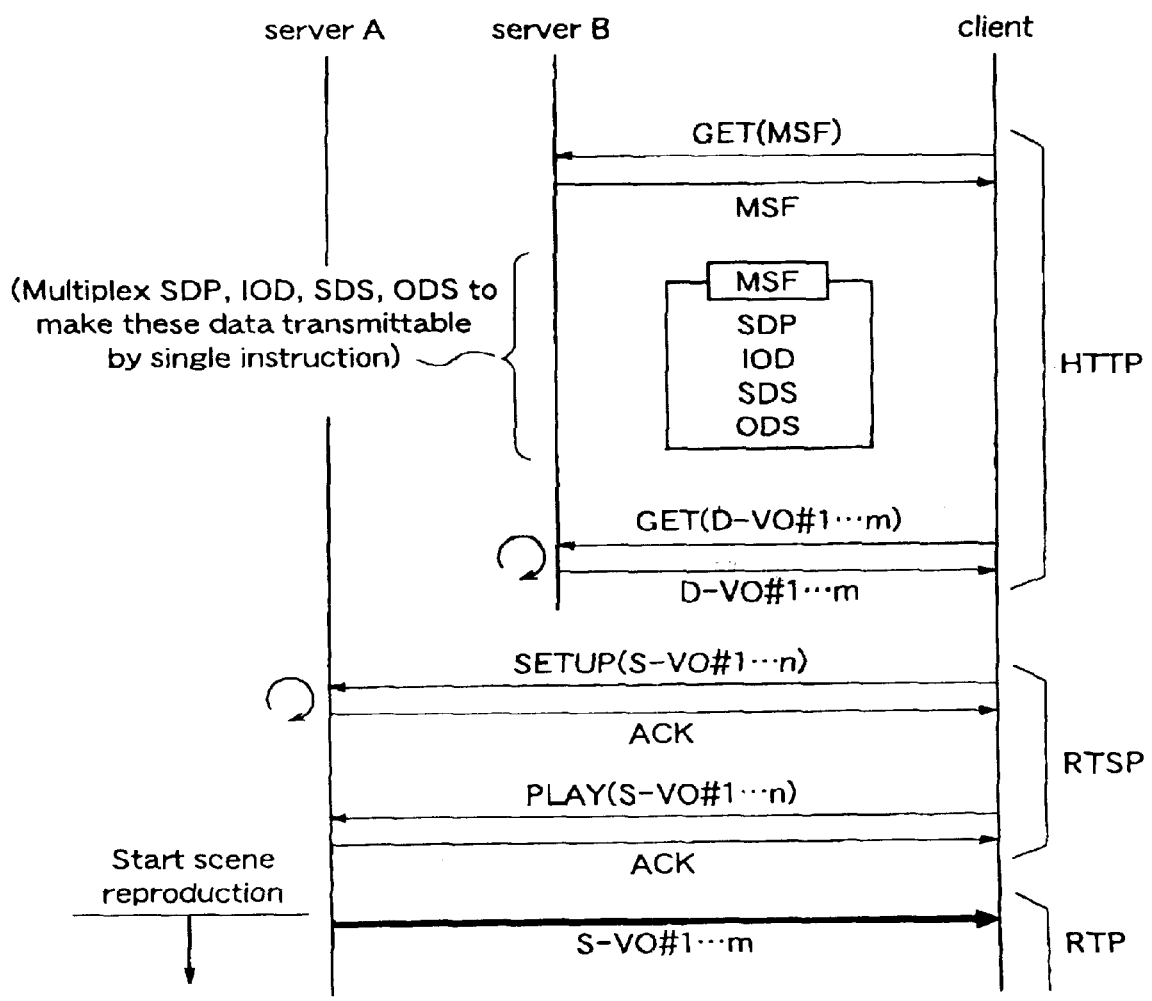
FIG. 6 is a diagram for explaining the procedure of session setup in a data transmission system according to a second embodiment of the present invention.
Figure 7:
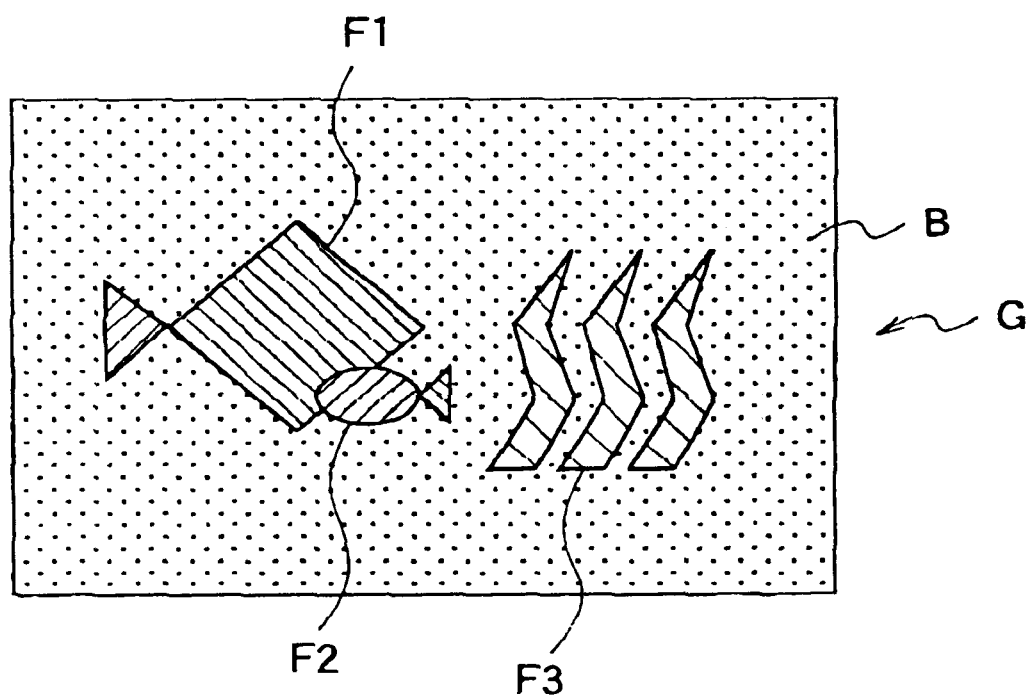
FIG. 7 is a diagram illustrating a composite image treated in MPEG4.
Figure 8:
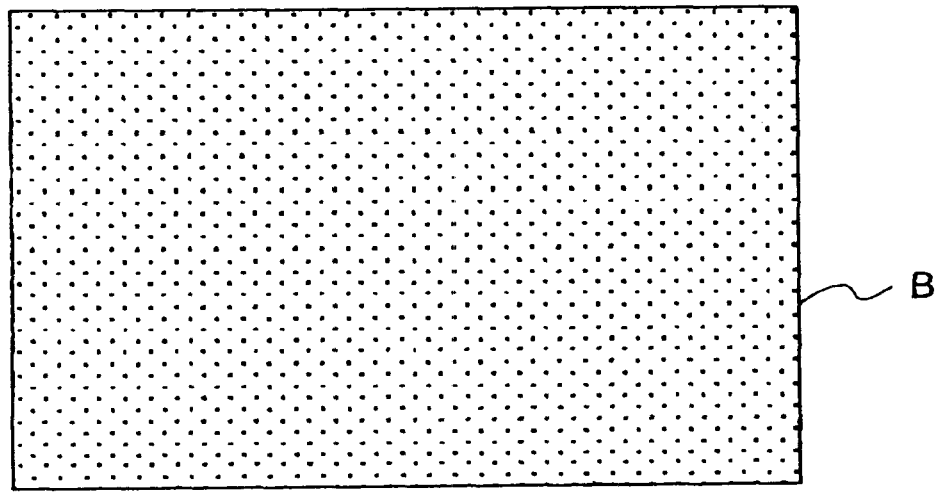
Figure 8:
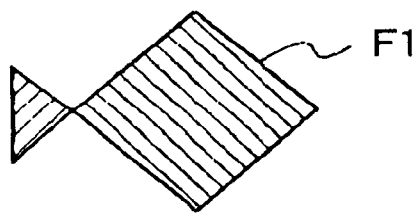
Figure 8:
Figure 8:
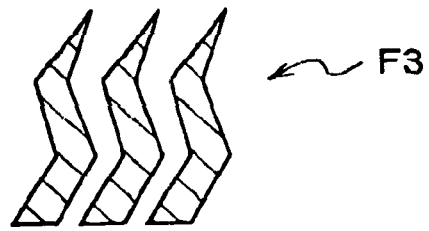
Figure 9:
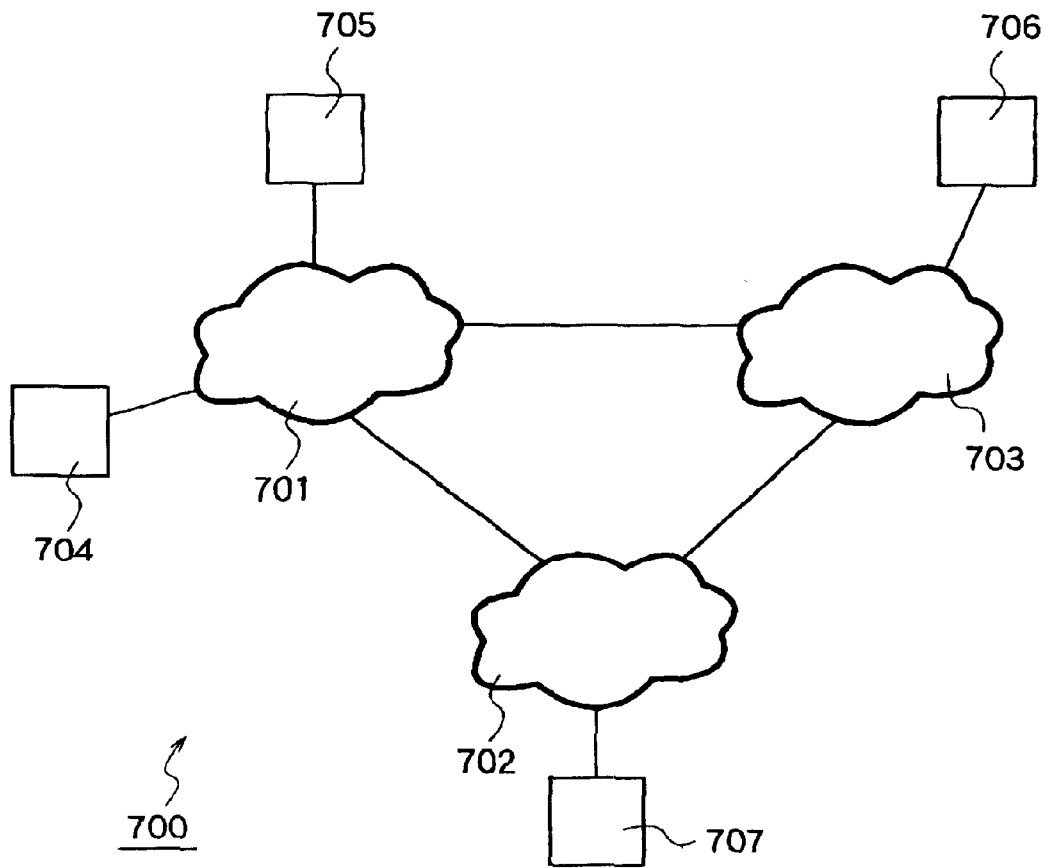
FIG. 9 is a schematic diagram for explaining the conventional network system.

FIG. 6 is a diagram for explaining a data transmission system according to a second embodiment of the present invention, illustrating the procedure of session setup in this data transmission system.

In the system of this second embodiment, the above-described SDP information, IOD information, ODS information (object descriptors OD of all objects) and SDS information (scene descriptions SD1~SDn at times t1~tn) are stored together, as setup file information (MSF information) in a predetermined server.

In this second embodiment, for example, in the state where a home page HP held by a predetermined server is displayed on the display unit of the client terminal 200 as shown in FIG. 10, when the user selects the character string "scene 1" in the home page HP by the mouse pointer MP and clicks the mouse, a request for the MSF information corresponding to the scene 1 is output to the server which holds the MSF information linked with the character string "scene 1". Thereby, the MSF information is transmitted from the server to the client terminal 200. The transmission of the MSF information is performed by download type transmission according to HTTP (Hyper Test Transfer Protocol) based on TCP (Transport Control Protocol).

Then, based on the contents of the SDP information stored in the MSF information (refer to FIG. 2), the client terminal 200 starts the process of obtaining the IOD information and the entity data of the respective objects.

The subsequent transmission process is identical to that described for the first embodiment.

In the second embodiment so constructed, since the SDP information, the IOD information, the ODS formation (object descriptors OD of all objects), and the SDS information (scene descriptions SD1~SDn at times t1~tn) are obtained together as setup file information (MSF information), the process of obtaining the control information is facilitated as compared with that of the first embodiment in which the SDP information, the IOD information, the ODS information, the SDS information, and the like are separately obtained.

While in the first and second embodiments image data has been described as object data corresponding to each of plural objects constituting one scene, the object data may be audio data. Further, the image data is not restricted to data of an image (natural image). It may be CG (computer graphics) data or text data.

While in the first embodiment the table information which associates the URL of the entity data of each object with the ODid of the object is stored in the SDP information, this table information may be separated from the SDP information and transmitted from the server to the client before or after sending the SDP information.

While in the second embodiment the table information which associates the URL of the entity data of each object with the ODid of the Object is stored in the SDP information in the MSF information, this table information may be stored in the MSF information separately from the SDP information.

Further, while in the first and second embodiments the SDS information has been described as data (control information) for specifying the hierarchy of plural objects constituting a scene and the locations of these objects in the scene, the control information is not restricted to the SDS information.

For example, instead of the SDS information, SMIL (Synchronized Multimedia Integration Language) may be employed. Also in this case, as in the aforementioned embodiments, object data corresponding to objects such as audio, video, and text can be transmitted or received by the download type transmission or the stream type transmission. Further, when the SMIL includes information identical to the IOD information, the ODS information, or the SDP information, it is not necessary to transmit the information.

Furthermore, while in the first and second embodiments data transmission between a saver and a client terminal has been described, the server and the client terminal may be personal computers, and the server may be a workstation. Further, in the case of data transmission between a first visual phone and a second visual phone, both of the data transmitting end and the data receiving end are client terminals.

Furthermore, in the data transmission systems according to the first and second embodiments, the download type transmission is performed according to HTTP (Hyper Text Transfer Protocol) based on TCP (Transport Control Protocol) while the stream type transmission is performed according to RTP (Real Time Transport Protocol) based on UDP (User Datagram Protocol). However, the download type transmission and the stream type transmission are not restricted to those mentioned above.

For example, when it is secured that the band width or the error rate in the network is at a fixed level, it is possible to perform the stream type transmission according to HTTP based on TCP.

What is claimed is:

1. A data transmission method for transmitting plural pieces of object data for reproducing plural objects constituting a scene, from a transmitting end to a receiving end, said method comprising:
   a first transmission process of transmitting first object data, among the plural pieces of object data, such that reproduction of the scene is performed at the receiving end based on the first object data after the transmission of the first object data has been completed; and
   a second transmission process of transmitting second object data other than the first object data, among the plural pieces of object data, such that reproduction of the scene is performed at the receiving end based on second object data during the transmission of the second object data.

2. A data transmission method for transmitting scene data for reproducing a scene, from a transmitting end to a receiving end, said method comprising:
   a first transmission process of transmitting first data which is a part of the scene data, in accordance with a first transmission protocol which does not necessarily perform retransmission against transmission errors; and
   a second transmission process of transmitting second data which is a part of the scene data, in accordance with a second transmission protocol which performs retransmission against transmission errors;
   wherein said second data is scene description information and object relevant information, and scene description information indicating a hierarchy of the respective objects constituting the scene, by object identifiers which are given to the respective objects for identifying the respective objects, and said object relevant information indicating additional information relating to the respective objects, in association with the object identifiers of the respective objects.

3. A data transmission method for transmitting scene data for reproducing a scene, from a transmitting end to a receiving end, said method comprising:
   transmitting object data for reproducing plural objects constituting the scene, object by object, from the transmitting end to the receiving end; and
   transmitting table information from the transmitting end to the receiving end, said table information associating, for each object, an object identifier with object data location information.

4. A data transmission system comprising:
   a data transmission apparatus operable to transmit plural pieces of object data for reproducing plural objects constituting a scene; and
   a data receiving apparatus operable to receive the plural pieces of object data and to reproduce the scene based on the object data;
   said data transmitting apparatus comprising:
      a first transmission unit operable to transmit first object data, among the plural pieces of object data, such that reproduction of the scene is performed at a receiving end based on the first object data after the transmission of the first object data has been completed, and
      a second transmission unit operable to transmit second object data other than the first object data, among the plural pieces of object data, such that reproduction of the scene is performed at the receiving end based on the second object data during the transmission of the second object data.

5. The data transmission system of claim 4, wherein said data transmission apparatus transmits, with the first transmission unit, control information for controlling transmission of the object data reproduction of the objects, as initial data to be transmitted to the receiving end in transmission of data corresponding to one scene, said control information including transmission mode identification information indicating that the object data corresponding to each of the objects constituting one scene is to be transmitted by the first transmission unit or the second transmission unit.

6. A data transmission system comprising:
   a data transmission apparatus operable to transmit scene data for reproducing a scene; and
   a data receiving apparatus operable to receive the scene data and reproducing the scene;
   said data transmission apparatus comprising;
      a first transmission unit operable to transmit first data which is a part of the scene data, in accordance with a first transmission protocol which does not necessarily perform retransmission against transmission errors, and
      a second transmission unit operable to transmit second data which is a part of the scene data, in accordance with a second transmission protocol which performs retransmission against transmission errors, and to transmit, as the second data, scene description information and object relevant information, said scene description information indicating a hierarchy of the respective objects constituting the scene, by object identifiers which are given to the respective objects for identifying the respective objects, and said object relevant information indicating additional information relating to the respective objects, in association with the object identifiers of the respective objects.

7. A data transmission system comprising:
   a data transmission apparatus operable to transmit, object by object, object data for reproducing plural objects constituting a scene; and
   a data receiving apparatus operable to receive the object data and reproducing the scene based on the object data; and
   said data transmission apparatus comprising an information transmission unit operable to transmit table information which associates, for each object, an object identifier with object data location information.

8. The data transmission system of claim 7, wherein said information transmission unit transmits the table information in such a manner that the table information is included in control information for controlling transmission of the object data and reproduction of the objects, said control information being initial information to be transmitted to the receiving end in transmission of data corresponding to the scene.

9. The data transmission system of claim 7, wherein said information transmission unit transmits the table information in such a manner that the table information is included in object relevant information which indicates additional information relating to the respective objects in association with object identifiers of the respective objects.

10. A data receiving method for receiving plural pieces of object data for reproducing plural objects constituting scene, transmitted from a transmitting end, and reproducing the scene based on the object data, said method comprising:
    a first receiving process of receiving second object data among the plural pieces of object data, and reproducing the scene based on the first object data after reception of the object data has been completed; and a second receiving process of receiving second object data other than the first object data among the plural pieces of object data and, simultaneously, reproducing the scene based on the second object data.

11. A data receiving method for receiving scene data for reproducing a scene, transmitted from a transmitting end, and reproducing the scene, said method comprising:

a first receiving process of receiving first data which is a part of the scene data, transmitted according to a first transmission protocol which does not necessarily perform retransmission against transmission errors; and a second receiving process of receiving second data which is a part of the scene data transmitted according to a second transmission protocol which performs retransmission against transmission errors;

wherein said second data is scene description information and object relevant information, said second description information indicating a hierarchy of the respective objects constituting the scene, by object identifiers corresponding to the respective objects, and said object relevant information indicating additional information relating to the respective objects, in association with the object identifiers of the respective objects.

12. A data receiving method for receiving scene data for reproducing a scene, transmitted from a transmitting end, and reproducing the scene, said method comprising:

receiving object data for reproducing plural objects constituting the scene, which are transmitted object by object from the transmitting end; and receiving table information transmitted from the transmitting end, said table information associating, for each object, an object identifier with object data location information.

13. A data receiving apparatus for receiving, at a receiving end, plural pieces of object data for reproducing plural objects constituting a scene, transmitted from a transmitting end, and reproducing the scene based on the object data, said apparatus comprising:

a first receiving unit operable to receive first object data among the plural pieces of object data;

a second receiving unit operable to receive second object data other than the first object data among the plural pieces of object data; and a reproduction unit operable to reproduce the scene based on the first object data and the second object data, in which scene reproduction based on the first object data is performed after reception of the first object data has been completed, while scene reproduction based on the second object data is performed in parallel with reception of the second object data.

14. The data receiving apparatus of claim 13 wherein:

said first receiving unit is operable to receive control information for controlling transmission of the object data and reproduction of the objects, as initial data transmitted to the receiving end in the transmission of data corresponding to the scene; and one of said first and second receiving units is operable to receive the object data corresponding to each object, according to transmission mode identification information which is included in the control information and indicates that the object data is to be received by the first receiving unit or the second receiving unit.

15. A data receiving apparatus for receiving scene data for reproducing a scene, transmitted from a transmitting end, and reproducing the scene, said apparatus comprising:

a first receiving unit operable to receive first data which is transmitted as a part of the scene data in accordance with a first transmission protocol that does not necessarily perform retransmission against transmission errors; and a second receiving unit operable to receive second data which is transmitted as a part of the scene data in accordance with a second transmission protocol that performs retransmission against transmission errors, and to receive, as the second data, scene description information and object relevant information, said scene description information indicating a hierarchy of the respective objects constituting the scene, by object identifiers corresponding to the respective objects, and said object relevant information indicating additional information relating to the respective objects, in association with the object identifiers of the respective objects.

16. A data receiving apparatus for receiving object data for reproducing objects constituting a scene, transmitted object by object from a transmitting end, and reproducing the scene, said apparatus comprising:

a first receiving unit operable to receive first data which is transmitted as a part of the scene data in accordance with a first transmission protocol that does not necessarily perform retransmission against transmission errors; and a second receiving unit operable to receive second data which is transmitted as a part of the scene data in accordance with a second transmission protocol that performs retransmission against transmission errors, and to receive, as the second data, table information transmitted from the transmitting end, said table information associating, for each object, an object identifier with object data location information.

17. The data receiving apparatus of claim 16, wherein said second receiving unit receives the table information as information included in control information for controlling transmission of object data corresponding to the respective objects and reproduction of the objects, said control information being received first as the scene data corresponding to one scene.

18. The data receiving apparatus of claim 16, wherein said second receiving unit receives the table information as information included in object relevant information transmitted from the transmitting end, said object relevant information indicating additional information relating to the respective objects, in association with object identifiers of the respective objects.

* * * * *

UNITED STATES PATENT AND TRADEMARK OFFICE
CERTIFICATE OF CORRECTION

PATENT NO.    : 6,580,756 B1                                              Page 1 of 1
DATED         : June 17, 2003
INVENTOR(S)   : Yoshinori Matsui et al.

It is certified that error appears in the above-identified patent and that said Letters Patent is hereby corrected as shown below:

Column 21,
Line 29, please replace "and scene" with -- said scene --

Column 22,
Line 61, please replace "constituting scene" with -- constituting a scene --.
Line 64, please replace "second" with -- first --.

Column 23,
Line 13, please replace "data" with -- data, --.
Line 17, please replace "second" with -- scene --.

Signed and Sealed this

Second Day of March, 2004

JON W. DUDAS
*Acting Director of the United States Patent and Trademark Office*